United States Patent [19]
Hayashi et al.

[11] Patent Number: 5,932,343
[45] Date of Patent: Aug. 3, 1999

[54] MAGNETIC RESISTANCE EFFECT ELEMENT AND METHOD FOR MANUFACTURE THEREOF

[75] Inventors: Kazuhiko Hayashi; Masafumi Nakada, both of Tokyo, Japan

[73] Assignee: NEC Corporation, Tokyo, Japan

[21] Appl. No.: 08/909,770

[22] Filed: Aug. 12, 1997

[30] Foreign Application Priority Data

Aug. 12, 1996 [JP] Japan ................................... 8-212518

[51] Int. Cl.$^6$ ....................................................... G11B 5/66
[52] U.S. Cl. .......................... 428/332; 428/336; 428/692; 428/694 R; 428/694 TR; 428/694 T; 428/694 TS; 428/694 TM; 428/900; 427/128; 427/129; 427/130; 427/131; 360/113; 324/252
[58] Field of Search ............................... 428/692, 694 R, 428/694 TR, 694 T, 694 TS, 694 TM, 900, 336, 332; 360/113; 324/252; 427/128–131

[56] References Cited

U.S. PATENT DOCUMENTS

| | | | |
|---|---|---|---|
| 5,302,434 | 4/1994 | Doerner | 428/65.6 |
| 5,378,548 | 1/1995 | Torii | 428/694 TS |
| 5,436,047 | 7/1995 | Howard | 428/64.2 |
| 5,549,978 | 8/1996 | Iwasaki | 428/692 |

FOREIGN PATENT DOCUMENTS

| | | |
|---|---|---|
| 2-61572 | 3/1990 | Japan . |
| 4-358310 | 12/1992 | Japan . |
| 5-347013 | 12/1993 | Japan . |
| 6-203340 | 7/1994 | Japan . |

OTHER PUBLICATIONS

David A. Thompson et al., "Thin Film Magnetoresistors in Memory, Storage, and Related Applications", *IEEE Transactions on Magnetics*, vol. MAG–11, No. 4, Jul. 1975, pp. 1039–1049.

Primary Examiner—Leszek Kiliman
Attorney, Agent, or Firm—Sughrue, Mion, Zinn, Macpeak & Seas, PLLC

[57] ABSTRACT

A magnetoresistive effect element has an NiO layer, an intermediate layer, a first ferromagnetic layer, a first MR enhancement layer, a non-magnetic layer, a second MR enhancement layer, a second ferromagnetic layer, and a protective layer, laminated in sequence onto an underlayer, the intermediate layer being made of a mixture of nickel oxide and a ferrous oxide materials.

32 Claims, 32 Drawing Sheets

| | MATERIAL | FILM THICKNESS (nm) |
|---|---|---|
| NICKEL OXIDE LAYER | $Ni_xO_{1-x}$ | 0~200 |
| INTERMEDIATE LAYER | $(Ni_xFe_{1-x})_yO_{1-y}$ | 1 |
| FIRST FERROMAGNETIC LAYER | NiFe | 6 |
| FIRST MR ENHANCEMENT LAYER | Co | 1 |
| NON - MAGNETIC LAYER | Cu | 2.5 |
| SECOND MR ENHANCEMENT LAYER | Co | 1 |
| SECOND FERROMAGNETIC LAYER | NiFe | 6 |

Fig. 5

|  | MATERIAL | FILM THICKNESS (nm) |
|---|---|---|
| NICKEL OXIDE LAYER | $Ni_xO_{1-x}$ | 0~200 |
| INTERMEDIATE LAYER | $(Ni_xFe_{1-x})_yO_{1-y}$ | 1 |
| FIRST FERROMAGNETIC LAYER | NiFe | 6 |
| FIRST MR ENHANCEMENT LAYER | Co | 1 |
| NON - MAGNETIC LAYER | Cu | 2.5 |
| SECOND MR ENHANCEMENT LAYER | Co | 1 |
| SECOND FERROMAGNETIC LAYER | NiFe | 6 |

Fig. 7

|  | MATERIAL | FILM THICKNESS (nm) |
|---|---|---|
| NICKEL OXIDE LAYER | $Ni_xO_{1-x}$ | 30 |
| INTERMEDIATE LAYER | $(Ni_xFe_{1-x})_yO_{1-y}$ | 0~5 |
| FIRST FERROMAGNETIC LAYER | NiFe | 40 |
| NON - MAGNETIC LAYER | Cu | 2.6 |
| SECOND FERROMAGNETIC LAYER | NiFe | 60 |

Fig. 9

| | MATERIAL | FILM THICKNESS (nm) |
|---|---|---|
| NICKEL OXIDE LAYER | NiO | 30 |
| INTERMEDIATE LAYER | $(Ni_xFe_{1-x})_yO_{1-y}$ | 1.0 |
| FIRST FERROMAGNETIC LAYER | NiFe | 4.0 |
| NON - MAGNETIC LAYER | Cu | 2.3 |
| SECOND FERROMAGNETIC LAYER | NiFeCo | 6.0 |

Fig.12

| FIRST FERROMAGNETIC LAYER | SECOND FERROMAGNETIC LAYER | MR RATIO (%) |
|---|---|---|
| NiFe | NiFe | 6 |
| NiFeCo | NiFe | 7 |
| Co | NiFe | 8 |
| FeCo | NiFe | 8 |
| NiFe | NiFeCo | 8 |
| NiFeCo | NiFeCo | 10 |
| Co | NiFeCo | 11 |
| FeCo | NiFeCo | 11 |
| NiFe | FeCo | 8 |
| NiFeCo | FeCo | 9 |
| Co | FeCo | 12 |
| FeCo | FeCo | 13 |

Fig. 13

| ADDITIVE TO COPPER | CORROSION POTENTIAL (mv) |
|---|---|
| NONE | −310 |
| Pd | −410 |
| Al | −320 |
| Pt | −510 |
| Ta | −420 |
| In | −340 |
| B | −330 |
| Nb | −350 |
| Hf | −450 |
| Mo | −370 |
| W | −380 |
| Re | −470 |
| Ru | −440 |
| Rh | −400 |
| Ga | −330 |
| Zr | −410 |
| Ir | −430 |
| Au | −500 |
| Ag | −420 |

Fig. 14

|  | MATERIAL | FILM THICKNESS (nm) |
|---|---|---|
| NICKEL OXIDE LAYER | NiO | 25 |
| INTERMEDIATE LAYER | $(Ni_xFe_{1-x})_yO_{1-y}$ | 1.5 |
| FIRST FERROMAGNETIC LAYER | NiFe | 3.0 |
| FIRST MR ENHANCEMENT LAYER | FeCo | 1.0 |
| NON - MAGNETIC LAYER | Cu WITH Ag OR Re ADDED | 3.0 |
| SECOND MR ENHANCEMENT LAYER | FeCo | 1.0 |
| SECOND FERROMAGNETIC LAYER | NiFe | 5.0 |

Fig. 15

| AMOUNT OF Ag ADDED TO Cu TO LAYER (at%) | HEAT - TREATMENT TEMPERATURE (°C) FOR A 50% REDUCTION IN MR RATIO WITH 1 HOUR OF HEAT TREATMENT |
|---|---|
| 0 | 220 |
| 2 | 230 |
| 3 | 240 |
| 5 | 250 |
| 7 | 260 |
| 10 | 270 |
| 15 | 275 |
| 20 | 275 |
| 30 | 280 |
| 40 | 280 |
| 50 | 280 |

Fig. 16

| AMOUNT OF Re ADDED TO Cu LAYER (at%) | HEAT-TREATMENT TEMPERATURE (°C) FOR A 50% REDUCTION IN MR RATIO WITH 1 HOUR OF HEAT TREATMENT |
|---|---|
| 0 | 220 |
| 2 | 225 |
| 3 | 235 |
| 5 | 250 |
| 7 | 260 |
| 10 | 270 |
| 15 | 270 |
| 20 | 275 |
| 30 | 280 |
| 40 | 280 |
| 50 | 280 |

Fig. 24

|  | MATERIAL | FILM THICKNESS (nm) |
|---|---|---|
| LOWER SHIELD LAYER | NiFe | 2 |
| LOWER GAP LAYER | ALUMINA | 0.07~0.15 |
| LOWER ELECTRODE LAYER | Mo | 0.05 |
| VERTICAL BIAS LAYER | CoCrPt | 0.025 |
| MAGNETORESISTIVE EFFECT ELEMENT | (REFER TO FIG. 25) | |
| GAP - ESTABLISHING INSULATION LAYER | ALUMINA | 0.01 |
| UPPER GAP LAYER | ALUMINA | 0.07~0.15 |
| UPPER SHIELD LAYER | NiFe | 2 |

Fig. 25

|  | MATERIAL | FILM THICKNESS (nm) |
|---|---|---|
| NICKEL OXIDE LAYER | $Ni_xO_{1-x}$ | 25 |
| INTERMEDIATE LAYER | $(Ni_xFe_{1-x})_yO_{1-y}$ | 1 |
| FIRST FERROMAGNETIC LAYER | NiFe | 1~20 |
| FIRST MR ENHANCEMENT LAYER | Co | 1 |
| NON-MAGNETIC LAYER | Cu | 1~4 |
| SECOND MR ENHANCEMENT LAYER | Co | 1 |
| SECOND FERROMAGNETIC LAYER | NiFe | 1~20 |
| PROTECTIVE LAYER | Cu | 1.5 |

CROSSPOINT (CP) POSITION = 1-x/y

Fig. 33

| ANTI-FERROMAGNETIC LAYER FILM THICKNESS (nm) | OUTPUT SIGNAL HALF-VALUE WIDTH (ns) |
|---|---|
| 5 | 12 |
| 10 | 15 |
| 20 | 20 |
| 30 | 25 |
| 50 | 30 |
| 100 | 50 |

□ Ni OXIDE/Co OXIDE
○ Ni OXIDE/Co OXIDE + Fe OXIDE

MAGNETIC RESISTANCE EFFECT ELEMENT AND METHOD FOR MANUFACTURE THEREOF

BACKGROUND OF THE INVENTION

1. Field of the Invention

The present invention relates to a magnetic resistance effect element for the purpose of reading an information signal that is recorded on a magnetic medium, and to a manufacturing method therefor.

2. Description of Related Art

In the past, there have been magnetic reading transducers known variously as magnetic resistance sensors (MR sensors) or magnetic resistance heads, and it has been known that these devices are capable of reading data from a magnetic surface with high linear density. The magnetic resistance sensor detects a magnetic field signal via the strength of the magnetic flux detected by the reading element (magnetic resistance effect element) and the resistance thereof, which changes as a function of direction.

Such sensors as this in the past have operated based on the anisotropic magnetic resistance (AMR) effect, whereby the one component of the resistance of the reading element varies in proportion to the square of cosine of the angle formed between the magnetization direction and the direction of the detected current flowing in the element. A detailed description of the AMR effect can be found, for example, in Thompson, "Memory, Storage, and Related Applications" in IEEE Transactions on Magnetics, MAG-11, p. 1039 (1975).

In recent literature, there has been described a more prominent magnetic resistance effect, in which a change in the resistance in a laminated magnetic sensor is attributed to spin-dependent conduction of conduction electrons between magnetic layers separated by a non-magnetic layer, and to spin-dependent conduction dispersion at the accompanying layer boundary.

This magnetic resistance effect is variously known as the giant magnetoresistive effect or the spin-valve effect. This type of magnetoresistive sensor is fabricated from an appropriate material, and provides an improvement in sensitivity over sensors which use the AMR effect, yielding a larger change in resistance. Using this type of sensor, the intraplanar resistance of a pair of ferromagnetic layers separated by a non-magnetic layer is varies in proportion to the cosine of the angle between the magnetization directions of the two layers.

Japanese Unexamined Patent Publication (KOKAI) No. 2-61572 discloses a laminated magnetic structure which yields a large magnetic resistance change that occurs by virtue of anti-parallel alignment of magnetization within a magnetic layer, ferromagnetic transition metals and alloys are given in the above-noted Japanese Unexamined Patent Publication as materials for use in the laminated magnetic structure. It also discloses a structure in which an anti-ferromagnetic layer is added to one of at least two ferromagnetic layers separated by an intermediate layer, and having FeMn as the material of the anti-ferromagnetic layer.

In Japanese Unexamined Patent Publication (KOKAI) No. 4-358310, there is disclosed a magnetoresistive sensor which has two ferromagnetic thin-film layers which are separated by a non-magnetic metal layer, wherein when an applied magnetic field is zero the magnetization directions of the two ferromagnetic thin-film layers intersect orthogonally, the resistance between two non-bonded ferromagnetic layers varying in proportion to the cosine of the angle between the magnetization directions of the two layers, this being independent of the direction of current flowing in the sensor.

In Japanese Unexamined Patent Application publication there is disclosed a magnetoresistive sensor based on the above-noted effect, this sensor including two ferromagnetic thin-film layers which are separated by a thin-film made of a non-magnetic material, wherein when an externally applied magnetic field is zero, the magnetization of an adjacent anti-ferromagnetic layer is maintained perpendicular with respect to the that of the ferromagnetic layer.

In the prior art, because FeMn, which oxidizes easily in air, is generally given as a candidate for use at the anti-ferromagnetic layer making up a spin-valve structure, practical use makes it essential either to add an additive material or to use a protective film. Additionally, in processing after this measure is taken, the characteristics deteriorate, so that the reliability of the finished element cannot be said to be sufficient.

If an NiO film or a CoPt film having good corrosion resistance, is used a method of increasing the ferromagnetic layer reverse magnetic field, a problem arises because of the tendency for hysteresis to occur in the R-H curve.

In view of the above-described drawbacks in the prior art, an object of the present invention is to provide a magnetoresistive effect element which has a large exchange coupled magnetic field applied from the anti-ferromagnetic layer to a fixed layer, and which, because the coercivity of the fixed layer is small, provides good playback characteristics because the amount of hysteresis in the R-H loop is small, and further to provide a method of manufacturing the above-noted element.

SUMMARY OF THE INVENTION

To achieve the above-noted object, a magnetoresistive effect element according to the present invention is an improved magnetoresistive effect element formed by an anti-ferromagnetic layer, an intermediate layer, a first ferromagnetic layer, a non-magnetic layer, and a second ferromagnetic layer, or a magnetoresistive effect element formed by an anti-ferromagnetic layer, an intermediate layer, a first ferromagnetic layers, a first MR enhancement layer, a non-magnetic layer, a second MR enhancement layer, and a second ferromagnetic layer. Basically, the improvement therein is the use of a nickel oxide as the anti-ferromagnetic layer and the use of a mixture of a nickel oxide an iron oxide as the intermediate layer.

In the above-noted structure, it is desirable that the film thickness of the intermediate layer be from 0.1 to 0.3 nm, and that a ratio of number of Ni atoms/(number of Ni atoms+number of O atoms) in the anti-ferromagnetic layer is in the range from 0.3 to 0.7, and a ratio of number of Ni atoms/(number of Ni atoms+number of Fe atoms+number of O atoms) in the intermediate layer is in the range from 0.1 to 0.5.

There are cases in which it is appropriate for the surface roughness of NiO to be no greater than 10 nm, and for NiFe or NiFeCo to be used as the main component of the first and second ferromagnetic layers. There are also cases in which it is appropriate for cobalt to be used as the main component of the first ferromagnetic layer, and for NiFe or NifeCo to be used as the main component of the second ferromagnetic layer.

In the above, the term "main component" is used with the meaning of either the component which exists in the largest amount, or the component having a recognized action or effect, that is, the effective component.

If one or more members of the group consisting of Pd, Al, Cu, Ta, In, B, Nb, Hf, Mo, W, Re, Ru, Rh, Ga, Zr, Ir, Au, and Ag is added to the non-magnetic layer, the resistance to corrosion is improved. It is desirable that one or more of the members of the group consisting of Cu, Ag, and Au be selected at the material of the non-magnetic layer.

This is because the use of Cu, Ag, or Au results in a high magnetoresistive change ratio. By using copper with a gold additive or copper with an Re additive as the material for the non-magnetic layer, the resistance to heat is improved. This is because non-dissolved Ar or Re in the copper collects at the grain boundary, thereby preventing diffusion of the grain boundary into the copper layer in the magnetic layer.

It is desirable that the film thicknesses of the first and second ferromagnetic layers be from 1 to 10 nm, that the height of the magnetoresistive effect element be 1 nm or less, that the film thickness of the non-magnetic layer be no less than 2 nm and no more than 3 nm, and that the film thickness of the anti-ferromagnetic layer be 30 nm or less.

This is because if the first and second ferromagnetic layers have thicknesses no greater than 10 nm, the static magnetic coupling between the first and second ferromagnetic layers weakens, and it is possible to improve the position of the crosspoint on the R-H curve. At below 1 nm, however, the difference in the average free path between case in which the direction of magnetization in the first and second ferromagnetic layers are parallel and the case in which these directions are anti-parallel is reduced, making it difficult to obtain a sufficient magnetoresistive change ratio.

It is desirable that, by rotating an applied magnetic field while the film is being grown, the angle formed between the easy axes of adjacent magnetic layers which are separated via an intervening non-magnetic layer is in the range 70 degrees to 90 degrees. This is because when the magnetization of the second ferromagnetic layer, is pointing toward the difficult axis of the second ferromagnetic layer, the magnetization reversal is chiefly the magnetic spin mode, so that the coercivity of the second ferromagnetic layer is reduced, enabling a reduction in the occurrence of Barkhausen noise when operating as a magnetoresistive head.

BRIEF DESCRIPTION OF THE DRAWINGS

FIG. 5 is a table which shows the configuration and materials of each layer of the first embodiment of a magnetoresistive effect element according to the present invention.

FIG. 7 is a table which shows the configuration and materials of each layer of the second embodiment of a magnetoresistive effect element according to the present invention.

FIG. 9 is a table which shows the configuration and materials of each layer of the third embodiment of a magnetoresistive effect element according to the present invention.

FIG. 12 is a table which shows the relationship between the materials of each layer and the MR ratio of the fourth embodiment of a magnetoresistive effect element according to the present invention.

FIG. 13 is a table which shows the results of measuring the corrosion potentials when various elements are added to the copper which is used as a non-magnetic layer in the fifth embodiment of a magnetoresistive effect element according to the present invention.

FIG. 14 is a table which shows the configuration and materials of each layer of the fifth embodiment of a magnetoresistive effect element according to the present invention.

FIG. 15 is a table which shows the relationship between a heat-treatment temperature T which lowers the MR ratio to 50% of the value it was before heat treatment at that temperature for 1 hour, with respect to various amounts of Ag added to copper in the magnetoresistive effect element of FIG. 14.

FIG. 16 is a table which shows the relationship between a heat-treatment temperature T which lowers the MR ratio to 50% of the value it was before heat treatment at that temperature for 1 hour, with respect to various amounts of Re added to copper in the magnetoresistive effect element of FIG. 15.

FIG. 24 is a table which shows the configuration and film thicknesses of each layer of the magnetoresistive sensor of FIG. 2.

FIG. 25 is a table which shows the configuration and material of each layer of the magnetoresistive effect element in the magnetoresistive sensor of FIG. 24.

FIG. 33 is a table which shows the relationship between the anti-ferromagnetic layer film thickness and the output signal half-value width, in the magnetoresistive sensor of FIG. 24.

DETAILED DESCRIPTION OF THE PREFERRED EMBODIMENTS

Embodiments of present invention are described below, with reference being made to the relevant accompanying drawings.

Figure 1:
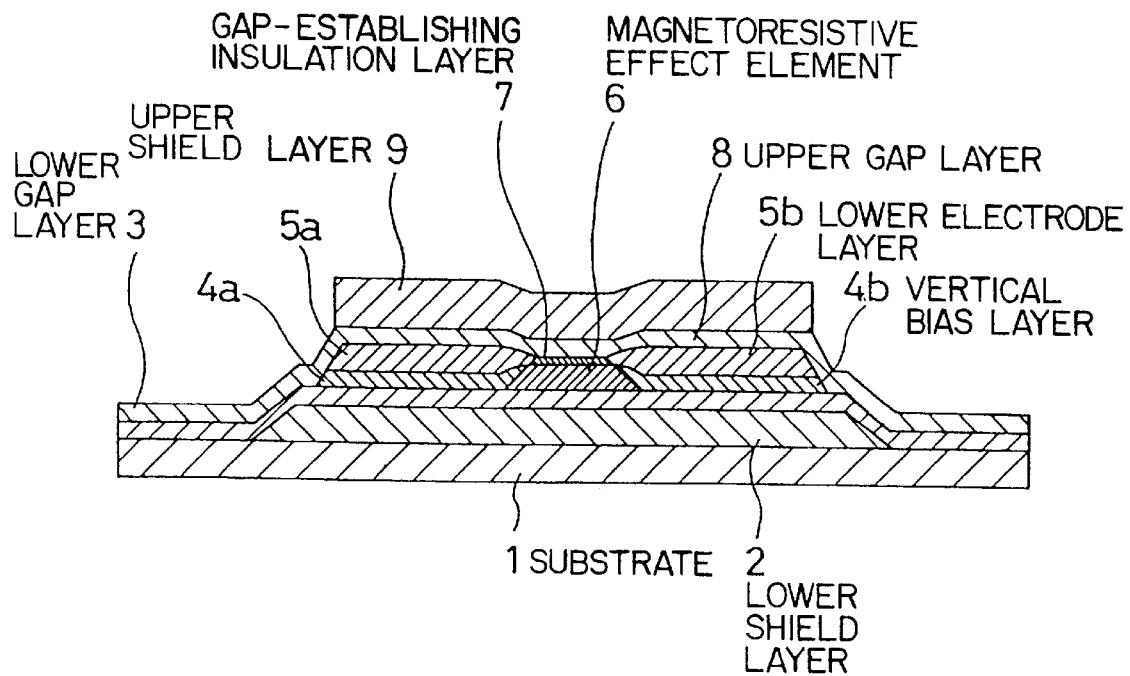
FIG. 1 is a simplified cross-sectional view which shows the first example of a shield type magnetoresistive sensor, to which a magnetoresistive effect element according to the present invention is applied.
Figure 2:
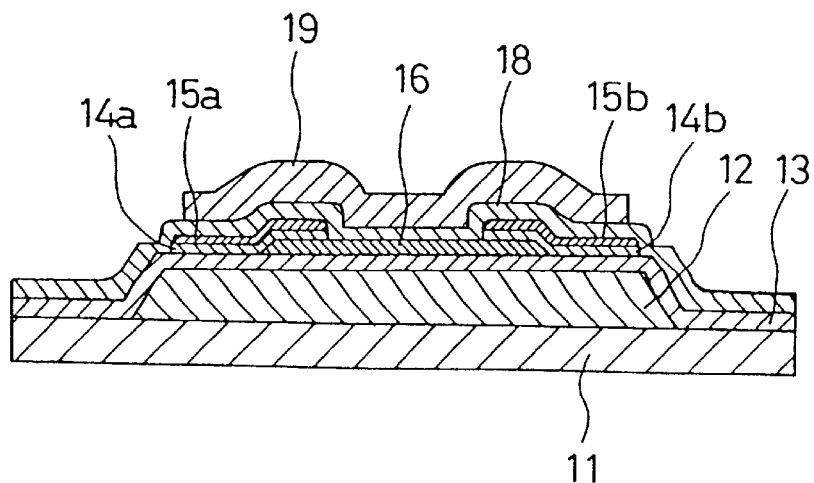
FIG. 2 is a simplified cross-sectional view which shows the second example of a shield type magnetoresistive sensor, to which a magnetoresistive effect element according to the present invention is applied.

FIG. 1 and FIG. 2 show the first and second embodiments of a shielded-type magnetoresistive sensor to which a magnetoresistive effect element according to the present invention is applied.

In the magnetoresistive sensor which is shown in FIG. 1, a lower shield layer 2, a lower gap layer 3, and a magnetoresistive effect element 6 are successively formed on a substrate 1. A gap-establishing insulation layer 7 might also be formed onto the top of the magnetoresistive effect element 6. The lower shield layer 2 is often patterned to an appropriate size using a photolithographic process.

The magnetoresistive effect element 6 is patterned to an appropriate shape using a photolithographic process, with vertical bias layers 4a and 4b and lower electrode layers 5a and 5b being successively laminated so as to make contact with the edges thereof. Then, over this structure an upper gap layer 8 and an upper shield layer 9 are laminated in that sequence.

In the magnetoresistive sensor which is shown in FIG. 2, a lower shield layer 12, a lower gap layer 13, and a magnetoresistive effect element 16 are laminated onto a substrate 11.

The lower shield layer 12 is often patterned to an appropriate size using a photolithographic process. The magnetoresistive effect element 16 is patterned to an appropriate shape by a photolithographic process, with vertical bias layers 14a and 14b, and lower electrode layers 15a and 15b successively laminated so as to partially overlap with the upper part thereof. Then, over this structure, an upper gap layer 18 and an upper shield layer 19 are laminated in that sequence.

In FIG. 1 and FIG. 2, the lower shield layers 2 and 12 can be made of NiFe, a CoZr alloy, FeAlSi, or a ferrous nitride type material or the like, the thickness of this layer preferably being in the range from 0.5 to 10 μm. The lower gap layers 3 and 13 can be made of, in addition to alumina, SiO2, aluminum nitride, or silicon nitride or the like, the film thickness of this layer preferably being in the range from 0.03 to 0.2 μm.

The lower electrode layers 5a, 5b, 15a, and 15b are preferably made of one of the group consisting of Zr, Ta, and Mo, or of an alloy or mixture of two or more members thereof, the film thickness of this layer preferably being in the range from 0.01 to 0.10 μm.

The vertical bias layers 4a, 4b, 14a, and 14b can be made of such materials as CoCrPt, CoCr, CoPt, CoCrTa, FeMn, NiMn, NiO, or NiCoO. Alumina, SiO2, and aluminum nitride and the like are appropriate materials for the gap-establishing layers 9 and 19, the film thickness thereof preferably being in the range from 0.005 to 0.05 μm.

The upper gap layers 8 and 18 can be made from alumina, SiO2O, aluminum nitride, silicon nitride or the like, the film thickness thereof preferably being in the range from 0.03 to 0.20 μm.

Figure 3:
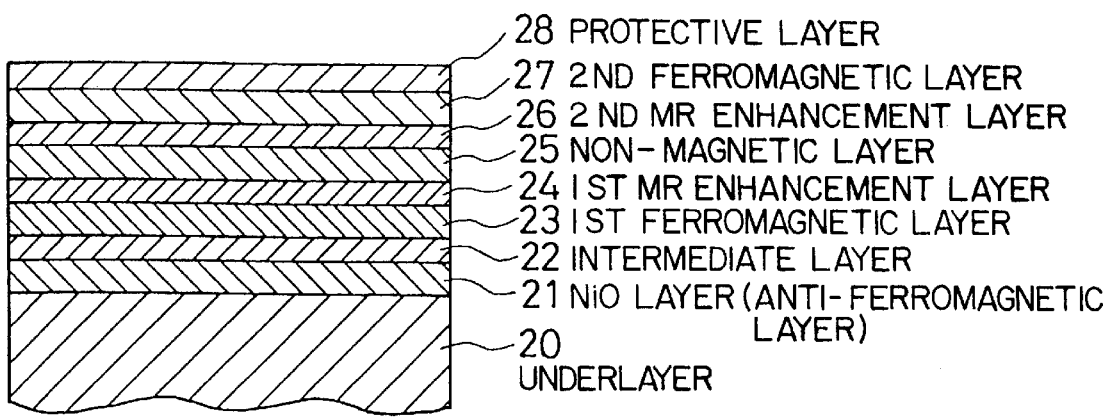
FIG. 3 is a simplified cross-sectional view which shows the first embodiment of a magnetoresistive effect element according to the present invention.
Figure 4:
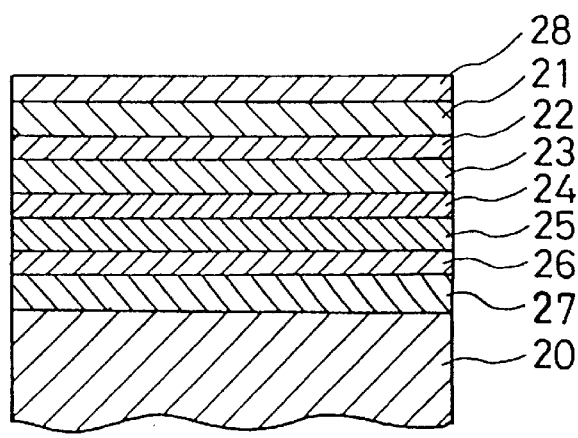
FIG. 4 is a simplified cross-sectional view which shows the second embodiment of a magnetoresistive effect element according to the present invention.

FIG. 3 and FIG. 4 show the first embodiment and the second embodiment, respectively, of a magnetoresistive effect element according to the present invention.

The magnetoresistive effect element of FIG. 3 has a structure having a NiO layer (anti-ferromagnetic layer) 21, an intermediate layer 22, a first ferromagnetic layer 23, a first MR enhancement layer 24, a non-magnetic layer 25, a second MR enhancement layer 26, a second ferromagnetic layer 27, and a protective layer 28 laminated over an underlayer 20, in this sequence.

The magnetoresistive effect element of FIG. 4 has a construction having a second ferromagnetic layer 27, a second MR enhancement layer 26, a nonmagnetic layer 25, a first MR enhancement layer 24, a first ferromagnetic layer 23, an intermediate layer 22, a NiO layer 21, and a protective film laminated over an underlayer 20 in this sequence.

In fabricating the above structures, the first ferromagnetic layer 23 can be made from NiFe, NiFeCo, a CoZr material, FeCoB, Sendust, a ferrous nitride material, or FeCo or the like, the film thickness of this layer preferably being in the approximate range from 1 to 10 nm.

The first MR enhancement layer 24 can be made from Co, NiFeCo, FeCo, or the like, the film thickness of this layer preferably being in the approximate range from 0.5 to 2 nm. In the case in which a first MR enhancement layer 24 is not used, although there will be a slight reduction in the MR ratio, there will be an accompanying reduction in the number of fabrication process steps.

The non-magnetic layer 25 can be made by copper or by the material formed by adding 1 to approximately 20 at % of Ag to copper, or by the material formed by adding 1 to approximately 20 at % of Re to copper, the film thickness thereof preferably being in the range from 2 to 3 nm.

The second MR enhancement layer 26 can be made of a material such as Co, NiFeCo, FeCo, or the like, the film thickness of this layer preferably being in the approximate range from 0.5 to 2 nm.

In the case in which a second MR enhancement layer 26 is not used, although there will be a slight reduction in the MR ratio, there will be an accompanying reduction in the number of fabrication process steps.

The second ferromagnetic layer 27 can be made from a material such as NiFe, NiFeCo, a CoZr material, FeCoB, Sendust, a ferrous nitride material, FeCo, or the like, the film thickness thereof preferably being in the approximate range from 1 10 nm.

In the case in which first and second ferromagnetic layers 23 and 27 are made from a material based on NiFe or NiFeCo, by making the underlayer 20 be a material with an fee structure of Ta, Hf, or Zr or the like, the crystal structure of the first and second ferromagnetic layers 23, 27 and the nonmagnetic layer 25 is improved and the MR ratio is improved.

The protective layer 28 can be made of an oxide or nitride or alloy thereof consisting one or more than one members selected from the group of Al, Si, Ta and Ti, or made from one of the from one of the members of the group consisting of Cu, Au, Ag, Ta, Hf, Zr, Ir, Si, Pt, Ti, Cr, Al, and C, or of an alloy or mixture of two or more of the members thereof.

Although by using these materials resistance to corrosion is improved, if they are not used, there is an accompanying reduction in the number of fabrication process steps.

Figure 6:
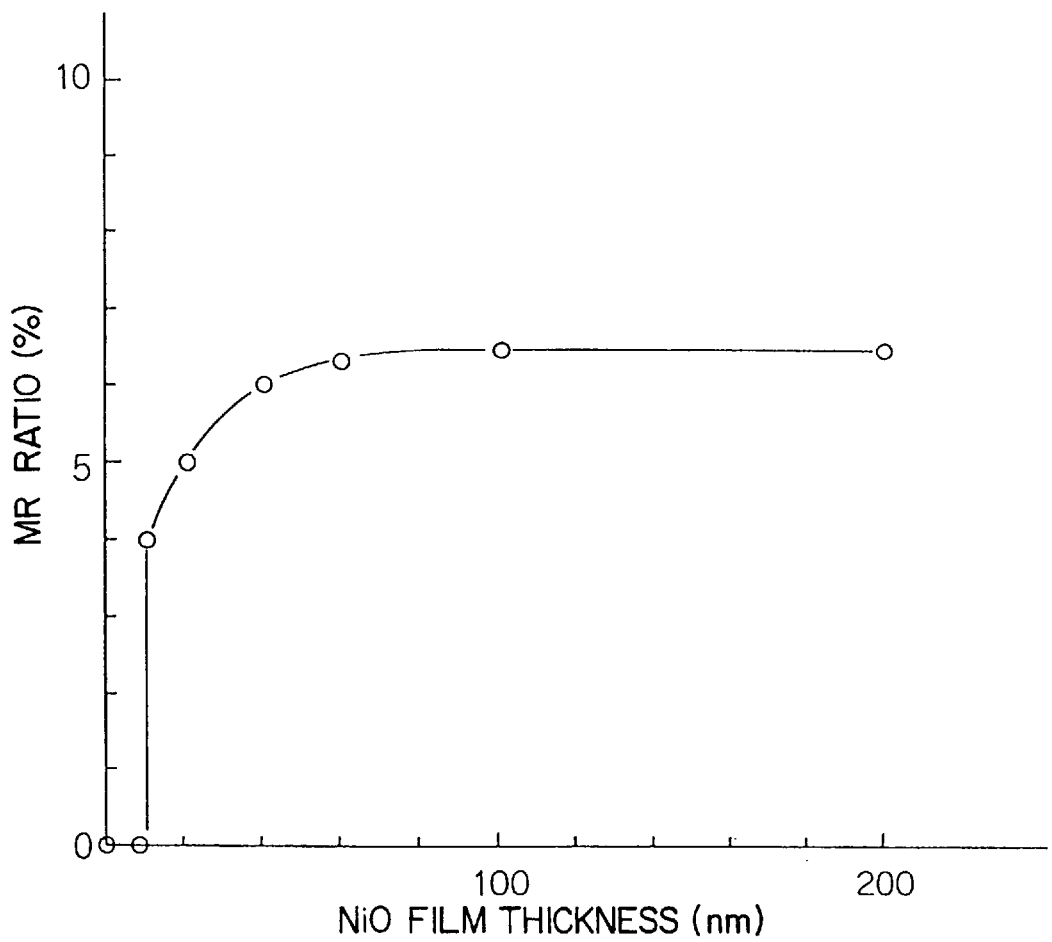
FIG. 6 is a graph which shows the relationship between the NiO layer film thickness and the MR ratio in the magnetoresistive effect element of FIG. 5.

First, a magnetoresistive effect element having the configuration, and layer materials and thicknesses shown in FIG. 5 was fabricated. The relationship in this element of the element MR ratio to the NiO film thickness is shown in FIG. 6.

As the NiO film thickness is reduced, the MR ratio shows almost no change until a film thickness of 60 nm, after which it drops, until it is almost zero at a film thickness of 10 nm. It can be seen that, to use this element as a magnetoresistive effect element, the film thickness of the NiO must be greater than 10 nm.

Figure 8:
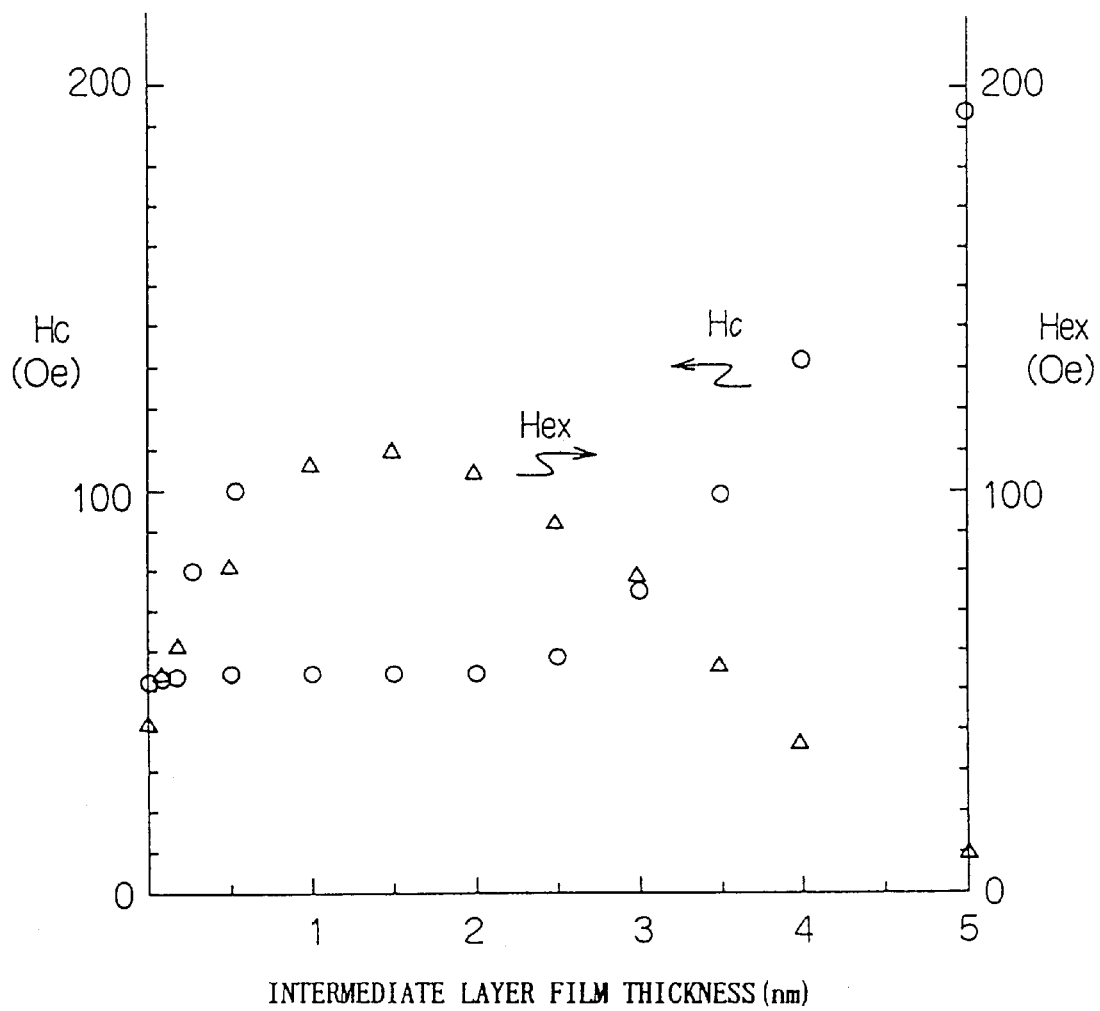
FIG. 8 is a graph which shows the relationship between intermediate layer film thickness, the coercivity Hc of the first ferromagnetic layer, and the exchange coupling magnetic field Hex in the magnetoresistive effect element of FIG. 7.

Next, a magnetoresistive effect element having the configuration, and layer materials and thicknesses shown in FIG. 7 was fabricated. For this case, the relationship between the element's coercivity Hc, the exchange coupling magnetic field Hex, and the (NixFe1−x)yO1−y layer film thickness is shown in FIG. 8.

As the intermediate layer film thickness is increased, Hc remains unchanged up until 2 nm, after which it increases monotonically.

In the case of Hex, as the intermediate layer film thickness is increased, Hex reaches a peak in the region of 1.5 nm, after which it decreases.

Because Hc grows to be larger than Hex in the region of 3 nm, it can be seen that it is appropriate to make the film thickness of the intermediate layer 3 nm or less.

Figure 10:
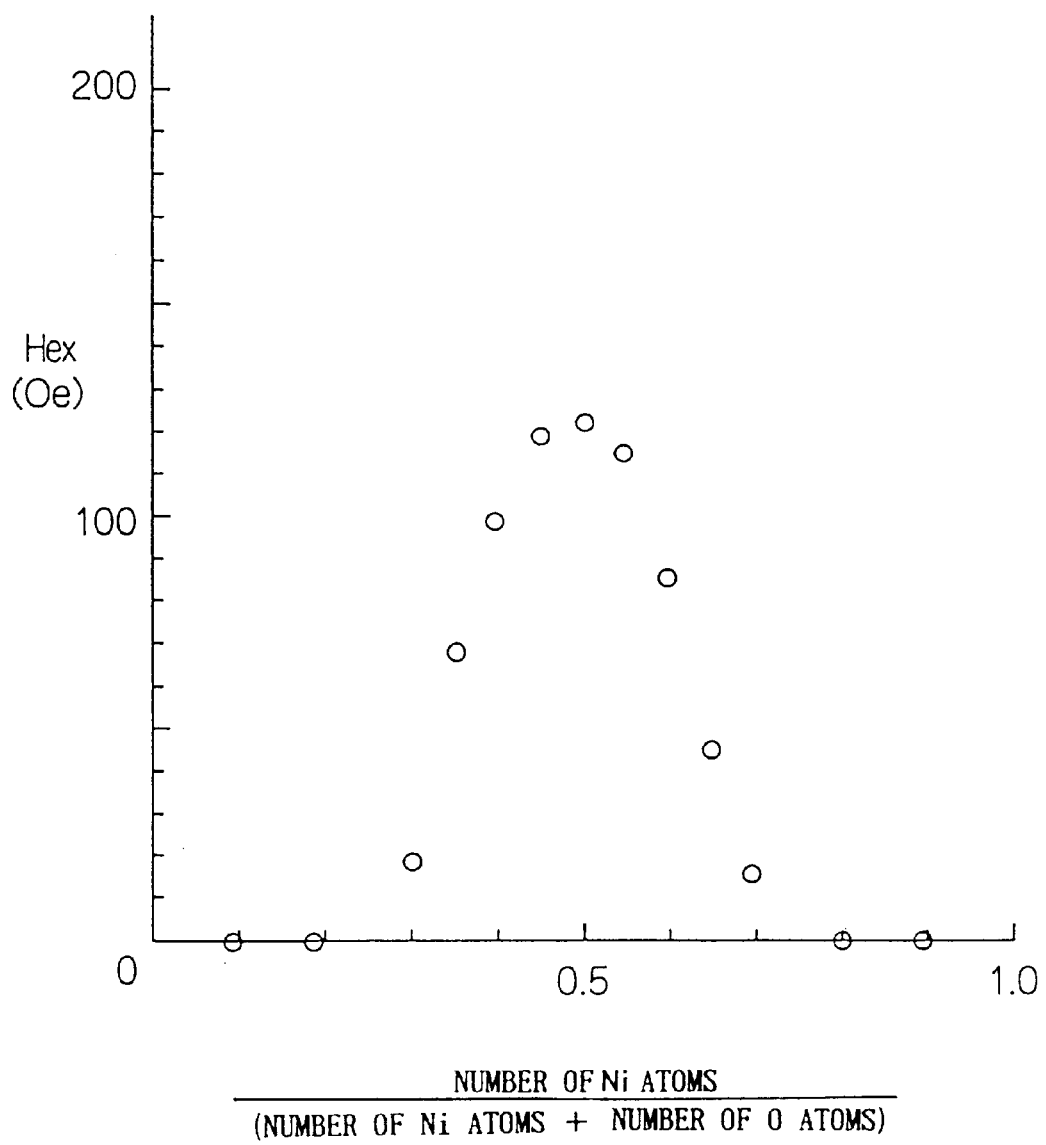
FIG. 10 is a graph which shows the relationship between the ratio of (Number of Ni atoms)/(Number of Ni atoms+ Number of 0 atoms) in the NiO layer of the magnetoresistive effect element of FIG. 9 and the exchange coupling magnetic field Hex, thereof.

Next, a magnetoresistive effect element having the configuration, and layer materials and thicknesses shown in FIG. 9 was fabricated. For this case, FIG. 10 shows the relationship between the ratio of (Number of Ni atoms)/ (Number of Ni atoms+number of O atoms) in the NiO layer and the exchange coupling magnetic field Hex. In the range 0.3 to 0.7, Hex is 60 Oe or greater, from which it can be seen that this is an appropriate range.

In this embodiment, the intermediate layer was made of a mixture of a nickel oxide and a ferrous oxide though, it can also be effective to introduce a cobalt oxide layer between the NiO layer and the first ferromagnetic layer, so as to reduce the coercivity Hc of the first ferromagnetic layer causing the hysteresis of R-H loop to be small.

However, when the cobalt oxide layer having relatively low Neel point is introduced thereinto, an overall Neel point of a layers formed by the NiO layer and the cobalt oxide layer, is reduced so as to form a film having a low heat resistance characteristic.

On the other hand, when a mixture of a nickel oxide and a ferrous oxide is introduced between the NiO layer and the first ferromagnetic layer, the Neel point of the layers formed by the NiO layer and the layer made of the mixture of a nickel oxide and a ferrous oxide is not reduced.

Figure 34:
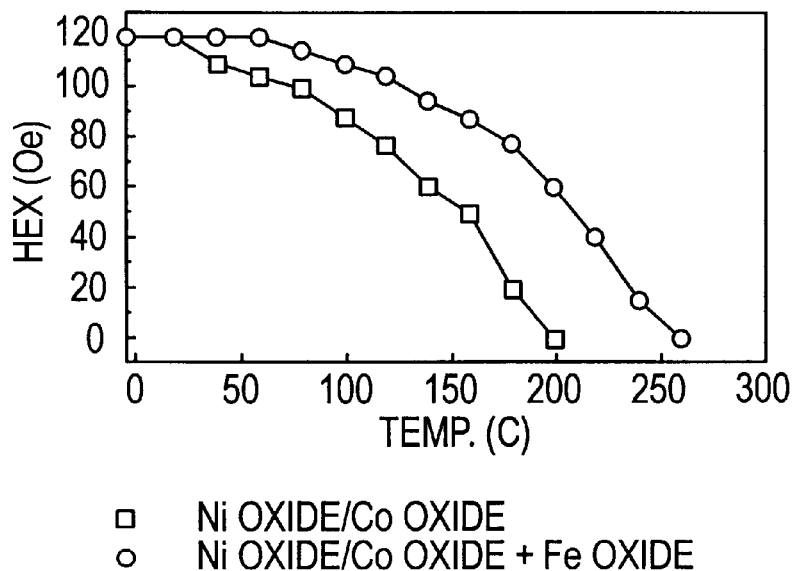
FIG. 34 shows a relationship between exchange coupling magnetic field Hex and the respective substance as introduced into a portion formed between the NiO layer and the first ferromagnetic layer.

And thus as shown in FIG. 34, the intermediate layer having superior heat resistance characteristic can be made by introducing the mixture of a nickel oxide and a ferrous oxide between the NiO layer and the first ferromagnetic layer, rather than by introducing the cobalt oxide layer thereinto, from a point of view of the anti-ferromagnetic layer serving effectively even in high temperature.

Further, a magnetoresistive effect element having the configuration, and layer materials and thicknesses shown in FIG. 9 was fabricated.

Figure 35:
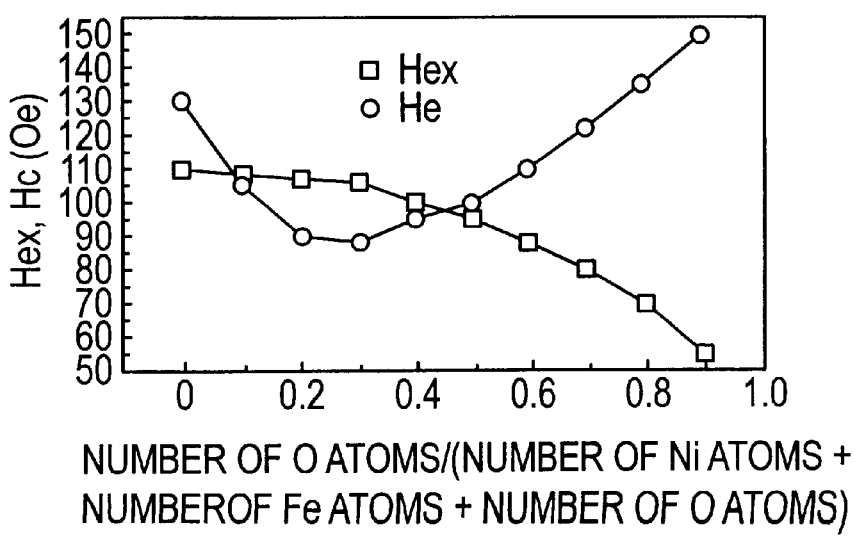
FIG. 35 shows the relationship between the ratio of number of 0 atoms/(number of Ni atoms+number of Fe atoms+number of 0 atoms) in $NixFe1-x)yO1-y$ layer film, coercivity Hc and exchange coupling magnetic field Hex.

FIG. 35 shows the relationship between the ratio of number of O atoms/(number of Ni atoms+number of Fe atoms+number of O atoms) in NixFe1−x)yO1−y layer film, coercivity Hc and exchange coupling magnetic field Hex.

As shown in FIG. 35, the ratio number of O atoms/ (number of Ni atoms+number of Fe atoms+number of O atoms) in NixFe1−x)yO1−y layer film is preferably defined by 0.1 to 0.5 in a magnetoresistive effect element since the value of exchange coupling magnetic field Hex exceeds the value of coercivity Hc within this area.

Figure 11:
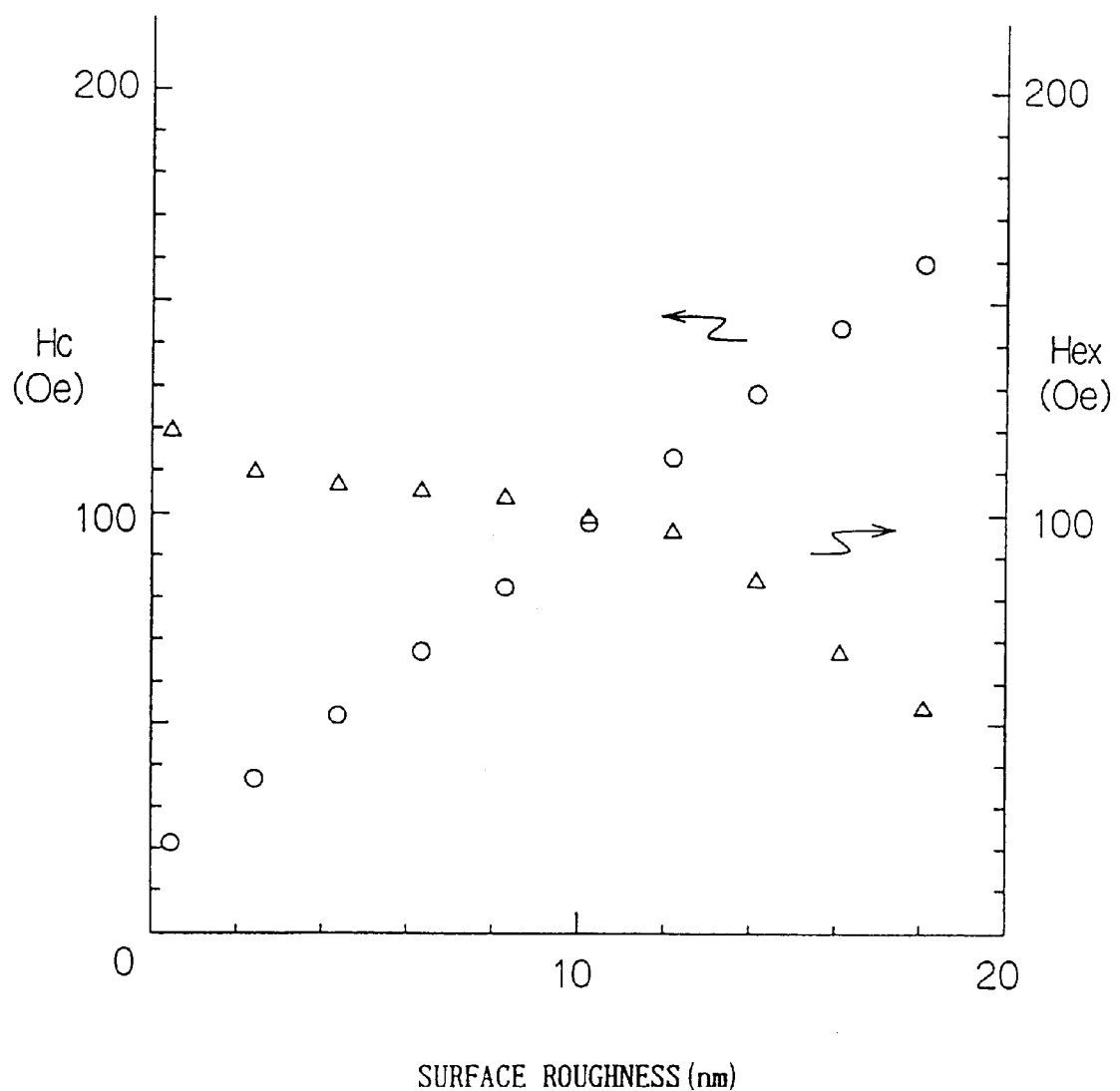
FIG. 11 is a graph which shows the relationship among the surface roughness of the NiO layer, the coercivity Hc of the second ferromagnetic layer, and the exchange coupling magnetic field Hex in the magnetoresistive effect element of FIG. 9.

Next, a magnetoresistive effect element having the configuration, and layer materials and thicknesses shown in FIG. 9 was fabricated, and an investigation was made of the relationship between the surface roughness immediately before forming the NiO film, the coercivity He, and the exchange coupling magnetic field Hex, the results thereof being shown in FIG. 11.

With an increase in the surface roughness, He increases, while Hex decreases. It can be seen that the region which satisfies the condition Hex>Hc, which is desirable for use as a magnetoresistive effect element, is that in which the surface roughness is 10 nm or less.

Next prototypes of magnetoresistive effect elements with a configuration having a alumina underlayer, an NiO layer of 30 nm, an NiFeO layer of 1.2 nm, a first ferromagnetic layer of 4 nm, a cooper layer of 2.5 nm, a second ferromagnetic layer of 6 nm, and a Ta protective layer of 1.5 nm were fabricated, with a variety of materials being used for the first and second ferromagnetic layers, the MR ratio of each being as shown in FIG. 12.

Next, the corrosion potentials for the cases of adding a variety of different elements to the copper used as a non-magnetic layer were measured, the results being as shown in FIG. 13. For any one of the elements, there was an improvement in the corrosion potential.

Next, a magnetoresistive effect element having the configuration which is shown in FIG. 14 was fabricated, the amount of Ag added to the copper was varied, and the heat-treatment temperature T at which one hour of treatment resulted in a 50% reduction in the MR ratio was determined for each added amount. It was seen that the temperature T monotonically increases as the amount of additive Ag is increased, this being shown in FIG. 15.

Next, a magnetoresistive effect element having the configuration which is shown in FIG. 14 was fabricated, the amount of Re added to the copper was varied, and the heat-treatment temperature T at which one hour of treatment resulted in a 50% reduction in the MR ratio was determined for each added amount.

It was seen that the temperature T monotonically increases as the amount of additive Re is increased, this being shown in FIG. 16.

Figure 17:
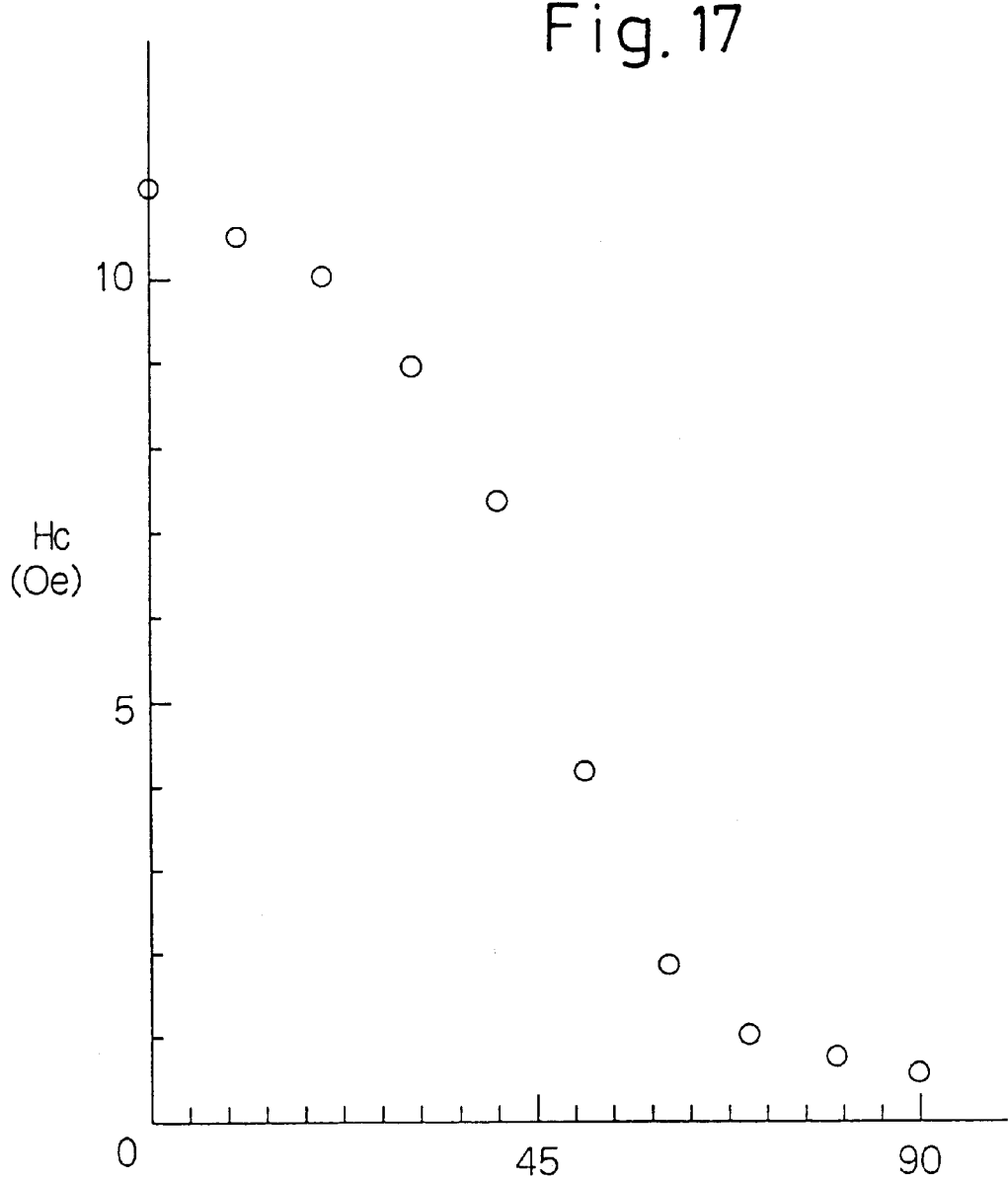
FIG. 17 is a graph which shows the relationship between the angle formed between the easy axes of the first and the second ferromagnetic layer and the coercivity of the second ferromagnetic layer in the magnetoresistive effect element of FIG. 15.

Next, an investigation was made of the relationship between the angle q formed between the easy axes of the first and second ferromagnetic layers and the coercivity of the second ferromagnetic layer, the results being shown in FIG. 17. The film configuration which is shown in FIG. 14 was used in this case.

As the angle q increased, Hc decreased monotonically, this falling to less than 1 Oe in the range from 70 to 90 degrees. It was seen that this range is the most desirable range for reducing the hysteresis of the element and reducing the Barkhausen noise of the head.

Next, a manufacturing method for the magnetoresistive effect elements shown in FIG. 3 and FIG. 4 will be described.

A substrate/nickel oxide/NiFe laminate which was priorly prepared was heat treated to form a mixture layer of nickel oxide and ferrous oxide between the nickel oxide and NiFe. Then, a non-magnetic layer, a second ferromagnetic layer or a first ferromagnetic layer, first MR enhancement layer, non-magnetic layer, second MR enhancement layer, and second ferromagnetic layer are formed, after which the heat-treatment method is used to form a magnetoresistive effect element.

Figure 18:
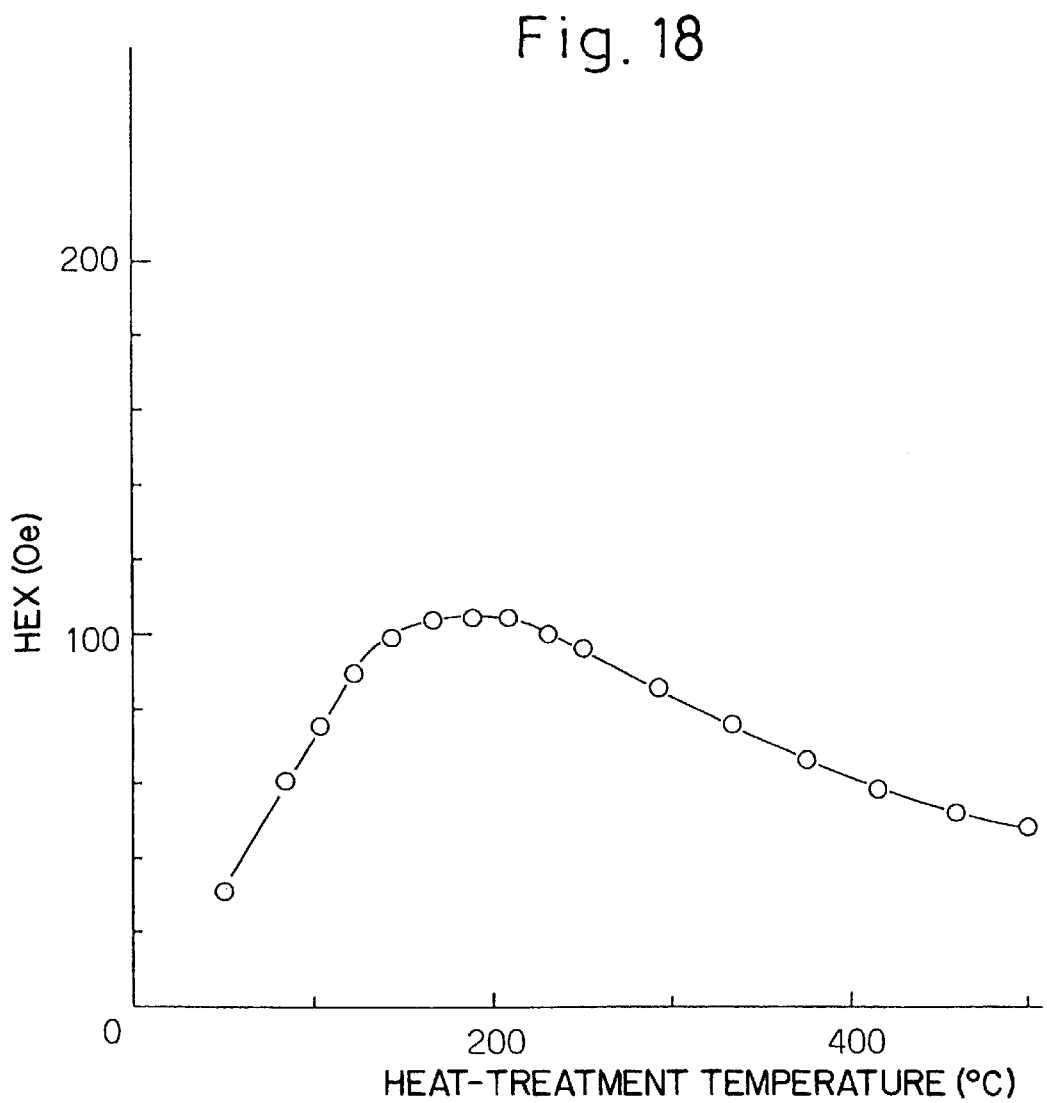
FIG. 18 is a graph which shows relationship between the heat-treatment temperature and exchange coupling magnetic field Hex in the first embodiment of a manufacturing method for a magnetoresistive effect element according to the present invention.

FIG. 18 shows the relationship between the exchange coupling magnetic field Hex and the heat-treatment temperature for the case in which NiO having a film thickness of 50.0 nm and then NiFe having a film thickness of 3.0 nm are formed on a substrate by sputtering method, with heat treatment at respective heat-treatment temperatures, after which cobalt having a film thickness of 1.0 nm, copper having a film thickness of 2.6 nm, cobalt having a film thickness of 1.0 nm, and then NiFe a film thickness of 5.0 nm are sputtered thereon.

Figure 19:
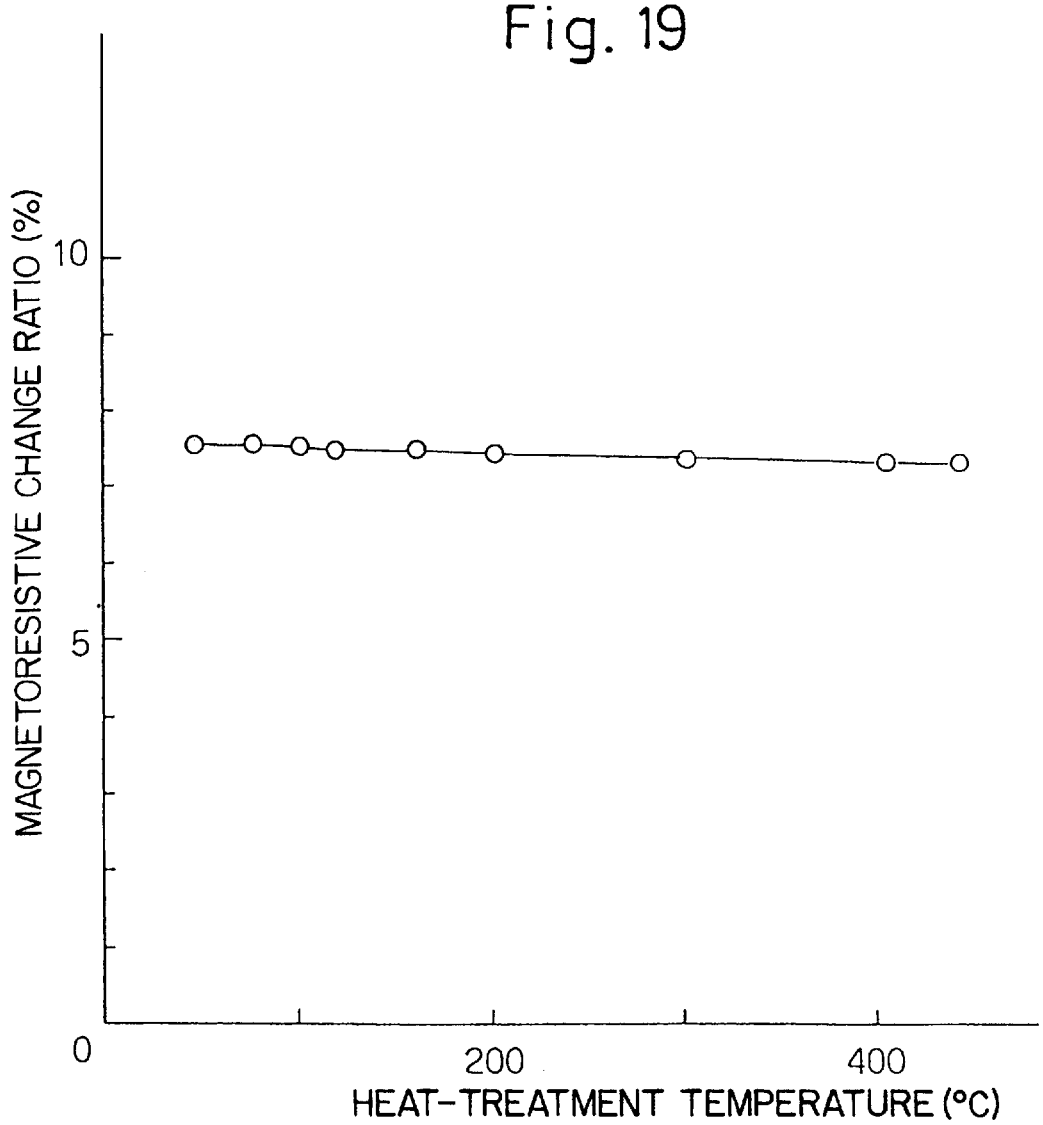
FIG. 19 is a graph which shows the relationship between the heat-treatment temperature and magnetoresistive change ratio in the first embodiment of a manufacturing method for a magnetoresistive effect element according to the present invention.
Figure 20:
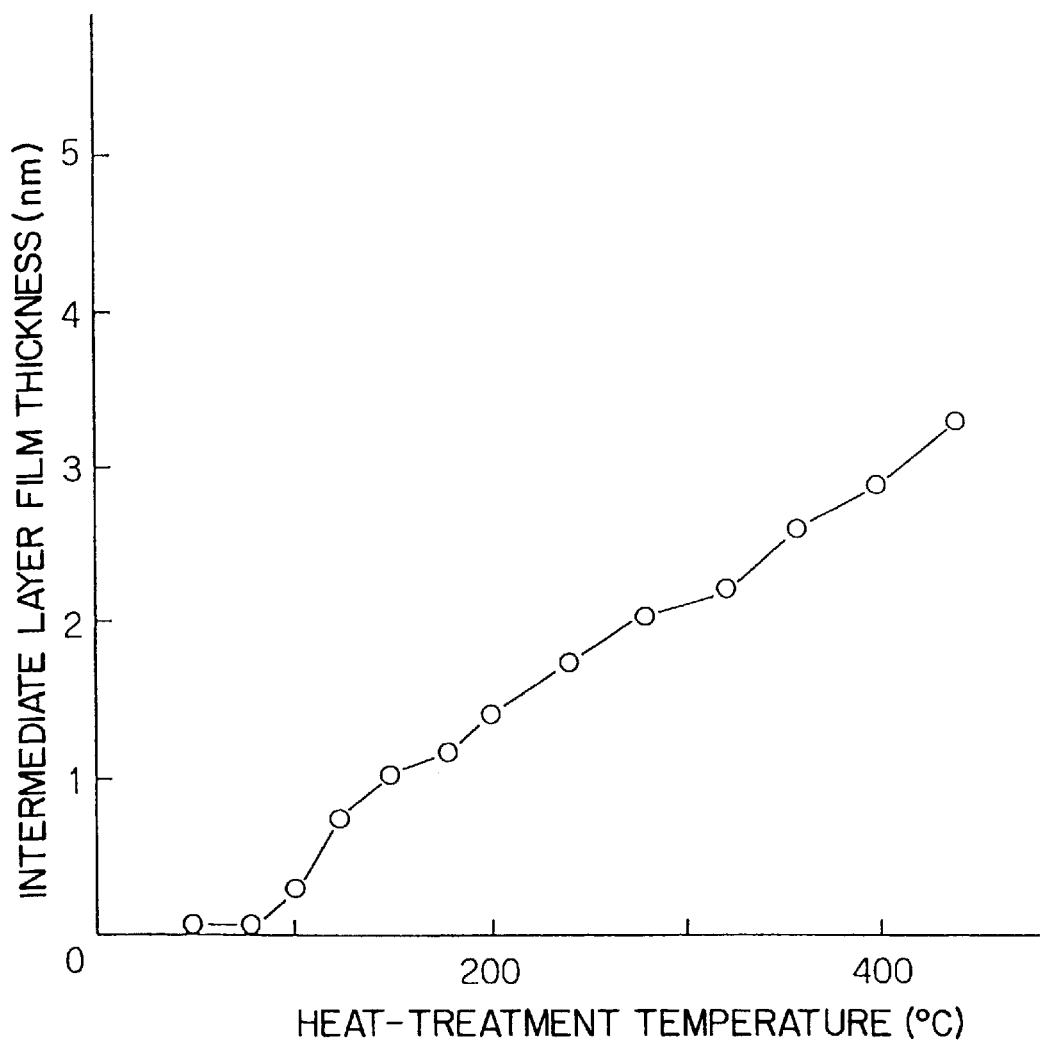
FIG. 20 is a graph which shows the relationship between the heat-treatment temperature and the intermediate layer film thickness in the first embodiment of a manufacturing method for a magnetoresistive effect element according to the present invention.
Figure 21:
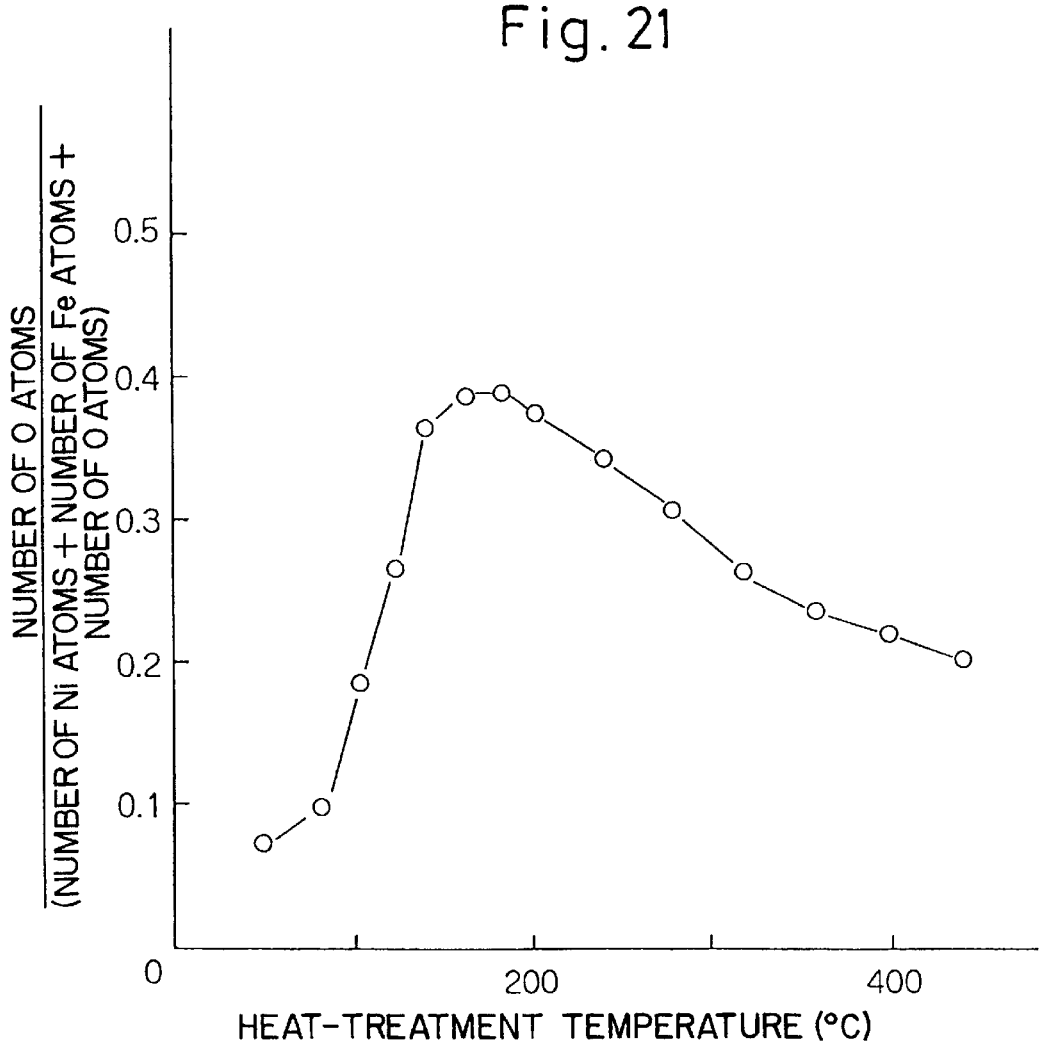
FIG. 21 is a graph which shows the relationship between the heat-treatment temperature and the ratio of (Number of 0 atoms/(Number of Ni atoms+number of Fe atoms+number of 0 atoms) in the intermediate layer in the first embodiment of a manufacturing method for a magnetoresistive effect element according to the present invention.

FIG. 19 shows the relationship between the magnetoresistive change ratio an the heat-treatment temperature. FIG. 20 shows the relationship between the intermediate layer film thickness and the heat-treatment temperature. FIG. 21 shows the relationship between the intermediate layer film composition and the heat-treatment temperature.

With an increase in the heat-treatment temperature, Hex increases, reaching a peak in the region of 180° C., after which is gradually decreases. From 80° C. to 400° C., Hex is above 60 Oe. The magnetoresistive change ratio does not change at all as the heat-treatment temperature changes. The film thickness of the intermediate layer monotonically increases with an increase in the heat-treatment temperature.

The ratio of number of 0 atoms/(Ni atoms+Fe atoms+0 atoms) monotonically increases with an increase in heat-treatment temperature, reaching a peak in the region of 180° C., after which it decreases.

Considering both the magnetoresistive change ratio and the exchange coupling magnetic field, it can be seen that a heat-treatment temperature range from 80 to 400° C. is appropriate.

A laminate consisting of a substrate, a nickel oxide material, NiFe, a non-magnetic layer, and a second ferromagnetic layer or consisting of a substrate, a nickel oxide material, a first ferromagnetic layer, a first MR enhancement layer, a non-magnetic layer, a second MR enhancement layer, and a second ferromagnetic layer was fabricated, after which the heat-treatment method was used to fabricate a magnetoresistive effect element.

Figure 22:
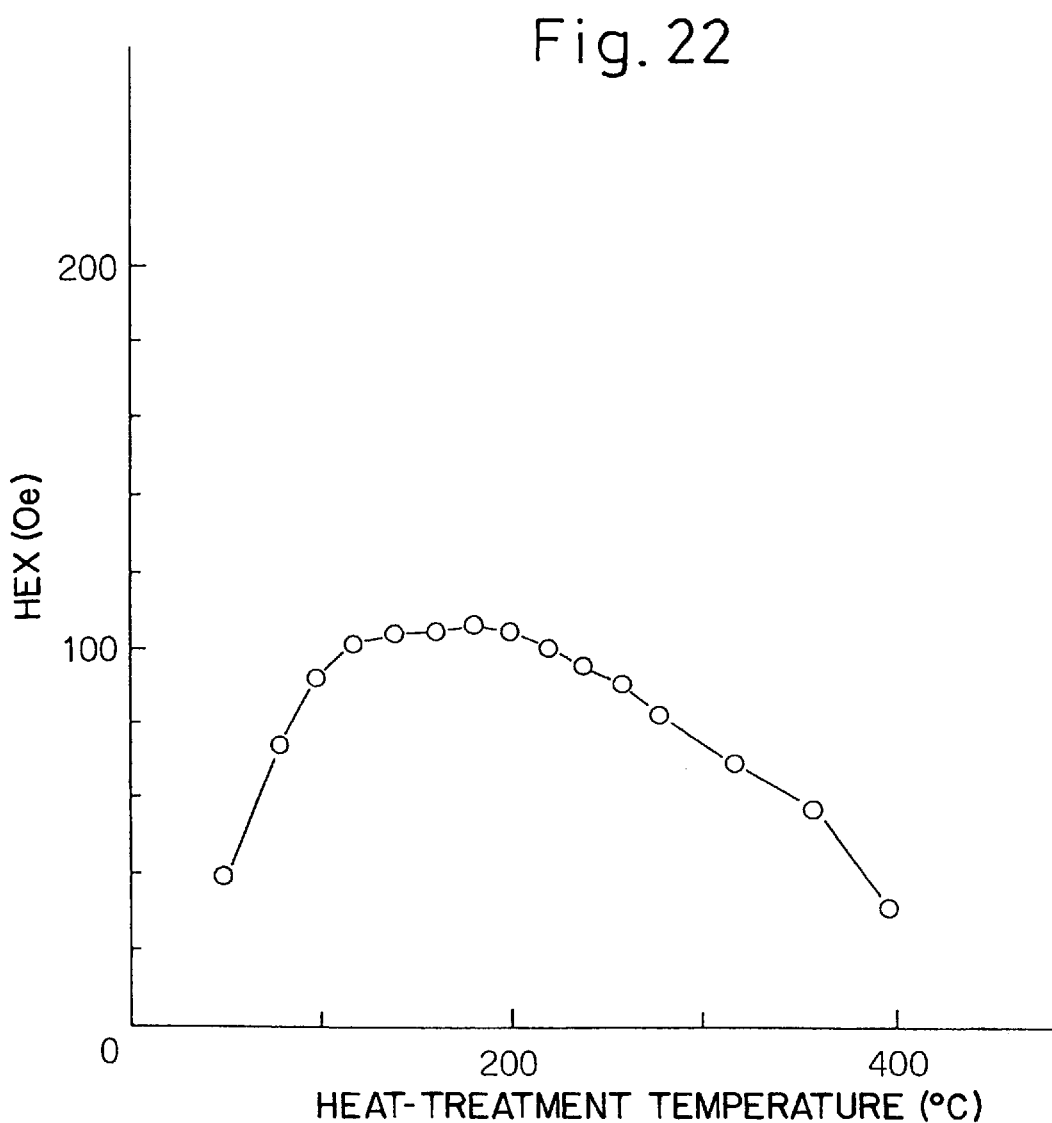
FIG. 22 is a graph which shows the relationship between the heat-treatment temperature and exchange coupling magnetic field Hex in the second embodiment of a manufacturing method for a magnetoresistive effect element according to the present invention.
Figure 23:
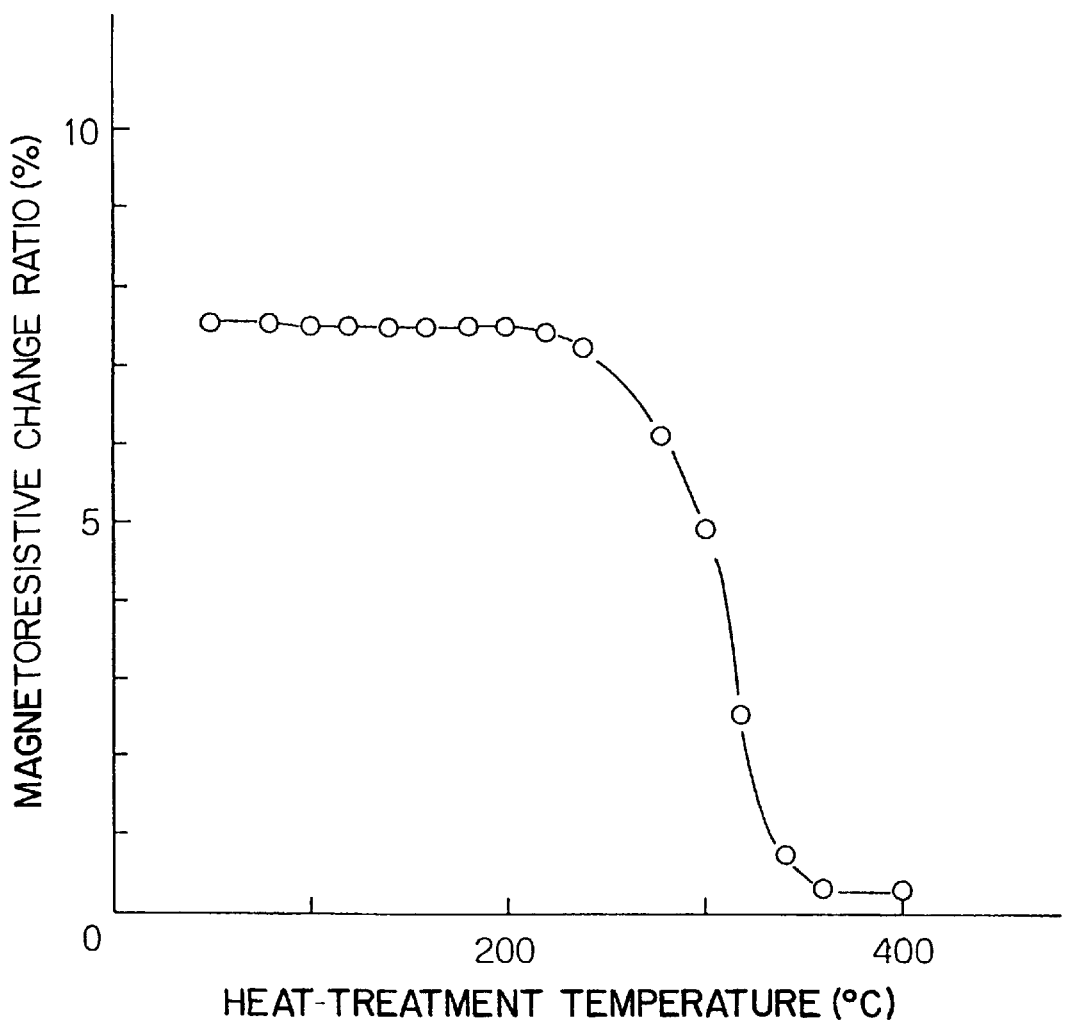
FIG. 23 is a graph which shows the relationship between the heat-treatment temperature and magnetoresistive change ratio in the second embodiment of a manufacturing method for a magnetoresistive effect element according to the present invention.

FIG. 22 shows the relationship of the exchange coupling magnetic field Hex and the heat-treatment temperature for the case in which NiO to a film thickness of 50 nm, NiFe to a film thickness of 3.0 nm, cobalt to a film thickness of 1.0 nm, copper to a film thickness of 2.6 nm, cobalt to a film thickness of 1.0 nm, and then NiFe to a film thickness of 5.0 nm are sputtered onto a substrate, after which heat treatment is done at the respective heat-treatment temperatures.

Theses results show that Hex increases with an increase in the heat-treatment temperature, reaching a peak in the region of 180° C., after which is gradually decreases.

From 80 to 350° C., Hex is greater than 60 Oe.

The magnetoresistive change ratio does not change with an increase in heat-treatment temperature up until 220° C., at which point it suddenly decreases.

The range of heat-treatment temperature over which a magnetoresistive change ratio of 5% or greater is obtained from 50° C. to 300° C. Thus, considering both the exchange coupling magnetic field and the magnetoresistive change ratio, it can be seen that in the case of the fabrication method, a heat-treatment temperature in the range from 50° C. to 300° C. is appropriate.

Next, playback heads using the configurations, materials, and film thicknesses shown in FIG. 2 and FIG. 24 were fabricated. In doing this, a magnetoresistive effect element having a configuration as shown in FIG. 25 was used.

Figure 26:
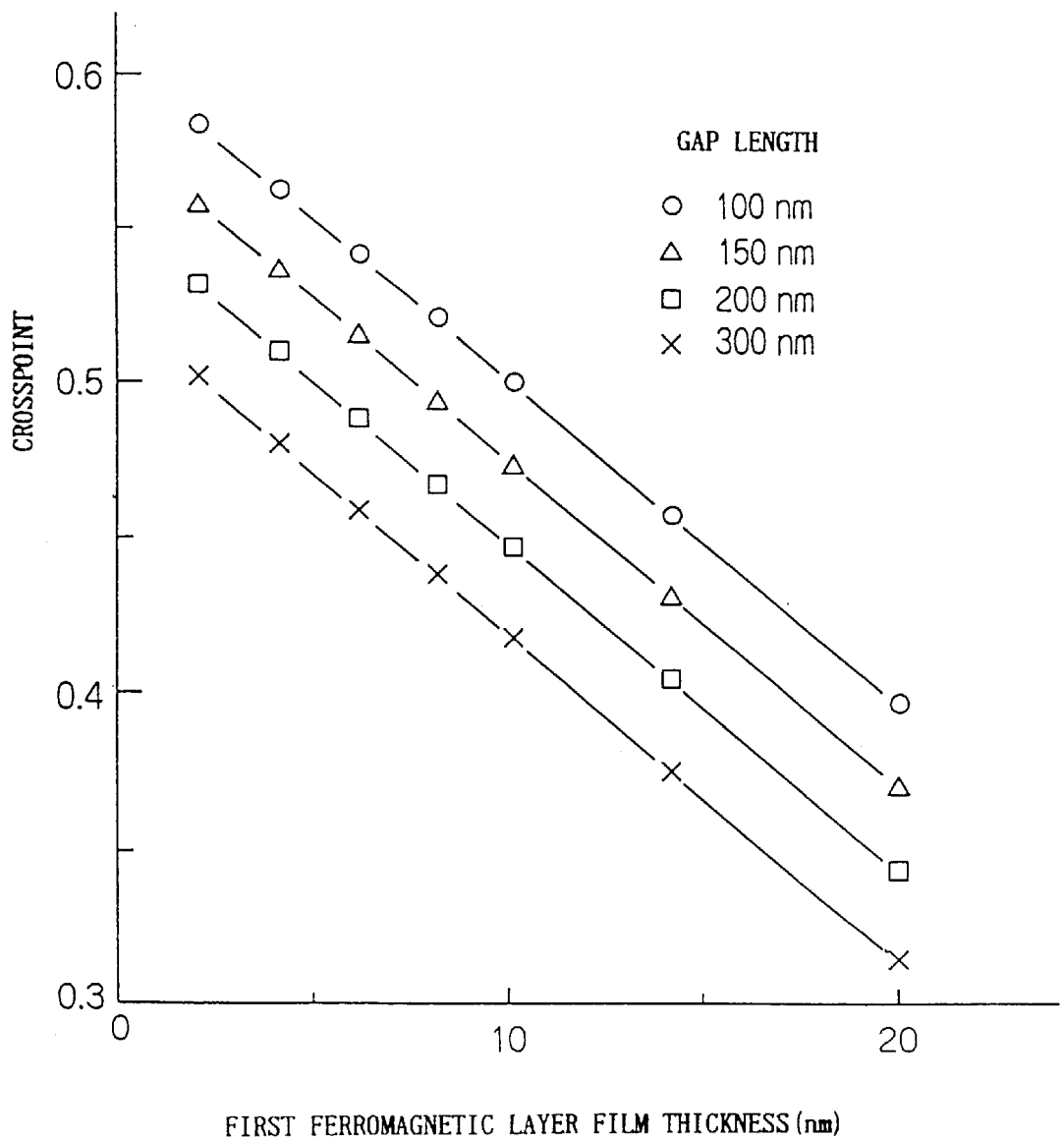
FIG. 26 is a graph which shows the relationship between first ferromagnetic layer film thickness and the crosspoint for various gap lengths.
Figure 27:
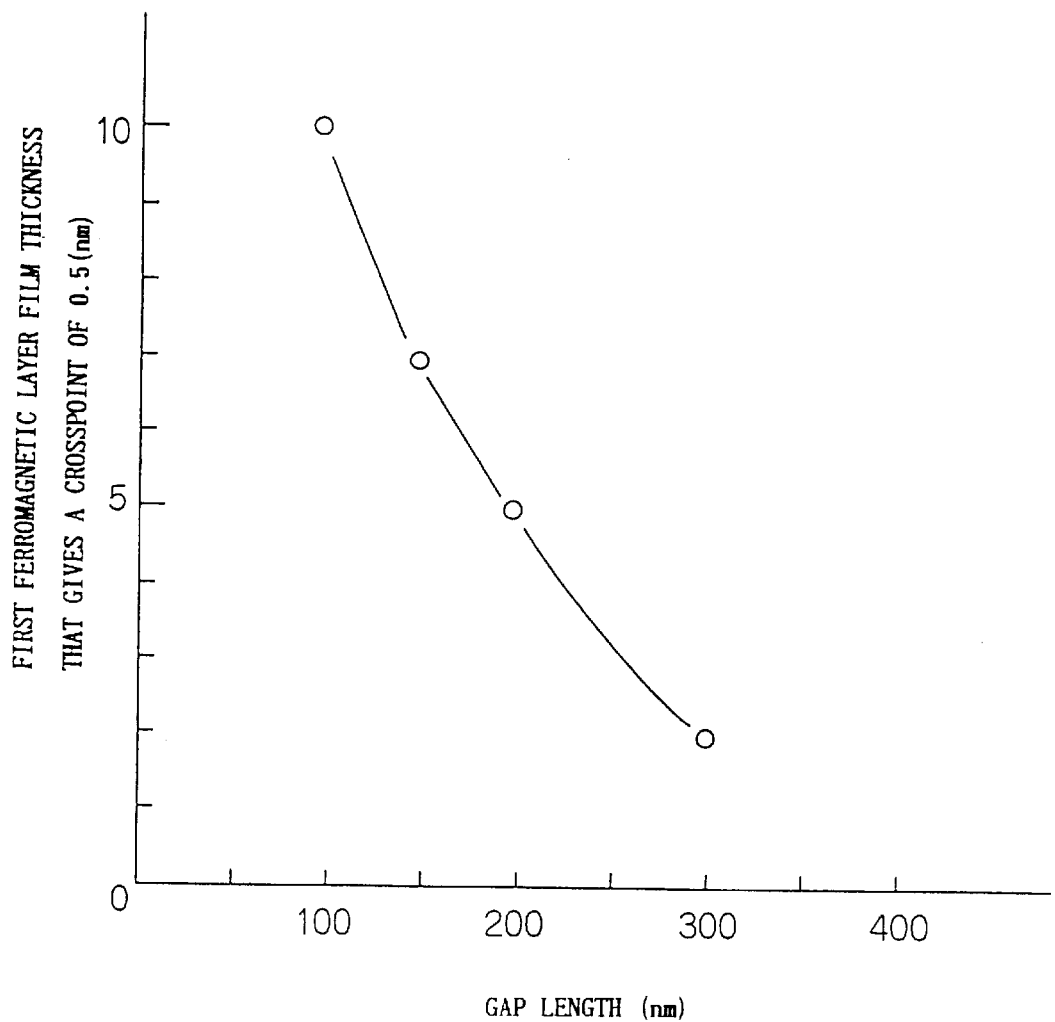
FIG. 27 is a graph which shows the relationship between the gap length and the first ferromagnetic layer film thickness at which the crosspoint is 0.5 in the magnetoresistive sensor of FIG. 24.

FIG. 26 shows the relationship between the crosspoint and the first ferromagnetic layer film thickness when the upper gap layer and lower gap layer film thicknesses are changed, and FIG. 27 shows the relationship between the thickness of the first ferromagnetic layer for which the crosspoint of 0.5 is given and the total film thickness of the upper gap layer and lower gap layer.

The gap length as used here is the sum of the film thicknesses of the upper gap layer and the lower gap layer. In this case, the film thicknesses of the upper gap layer and the lower gap layer were made the same, and the second ferromagnetic layer film thickness was held at 6 nm. The definition of the crosspoint is shown in FIG. 28.

The crosspoint decreased with an increase in the first ferromagnetic layer film thickness. The film thickness of the first ferromagnetic layer which gave a crosspoint of 0.5 decreased linearly with an increase in the film thicknesses of the lower gap layer and the upper gap layer, this being 10 nm or smaller in all cases.

Figure 29:
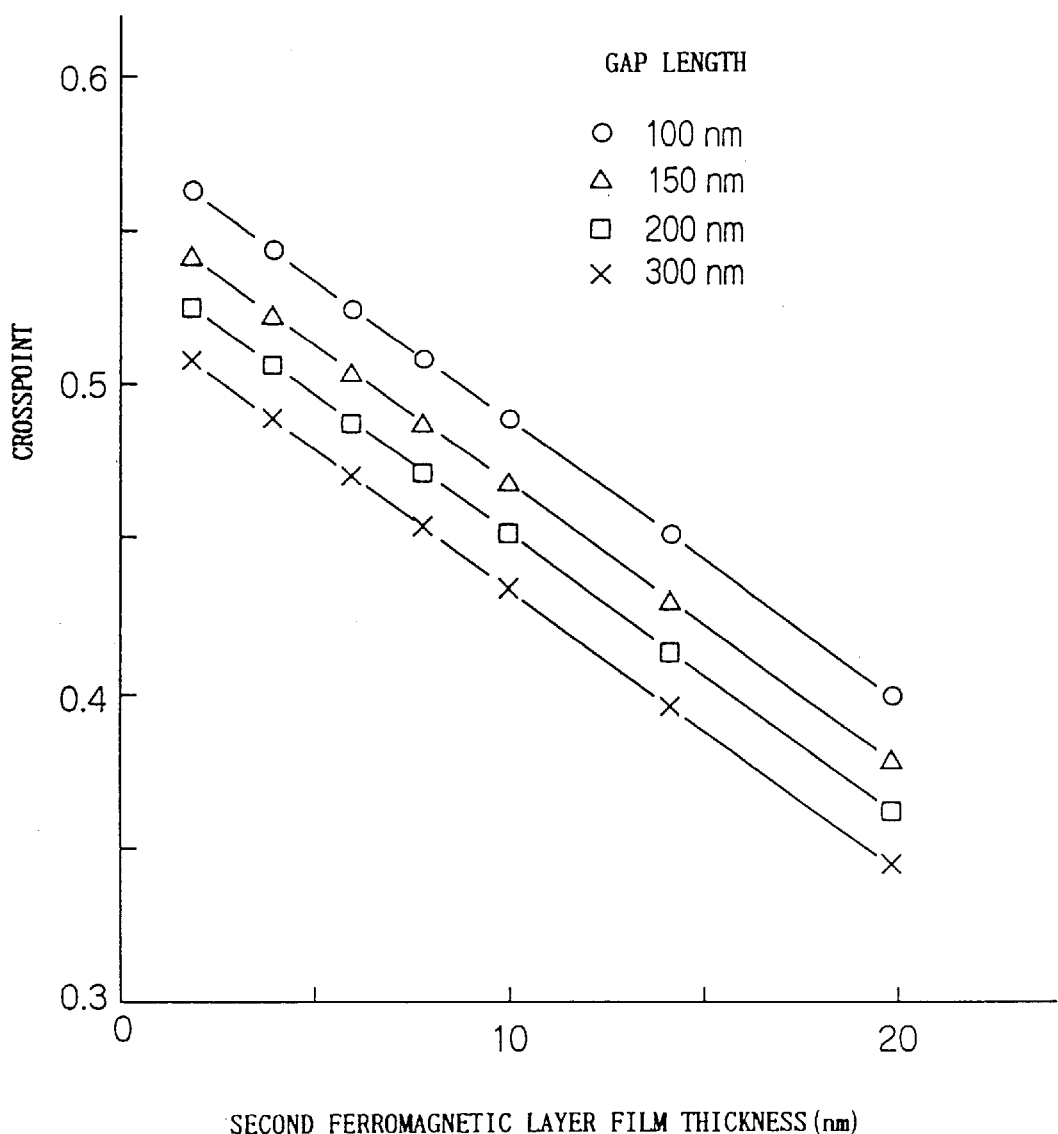
FIG. 29 is a graph which shows the relationship between the second ferromagnetic layer film thickness and the crosspoint for various gap lengths, in the magnetoresistive sensor of FIG. 24, when the gap length was changed.
Figure 30:
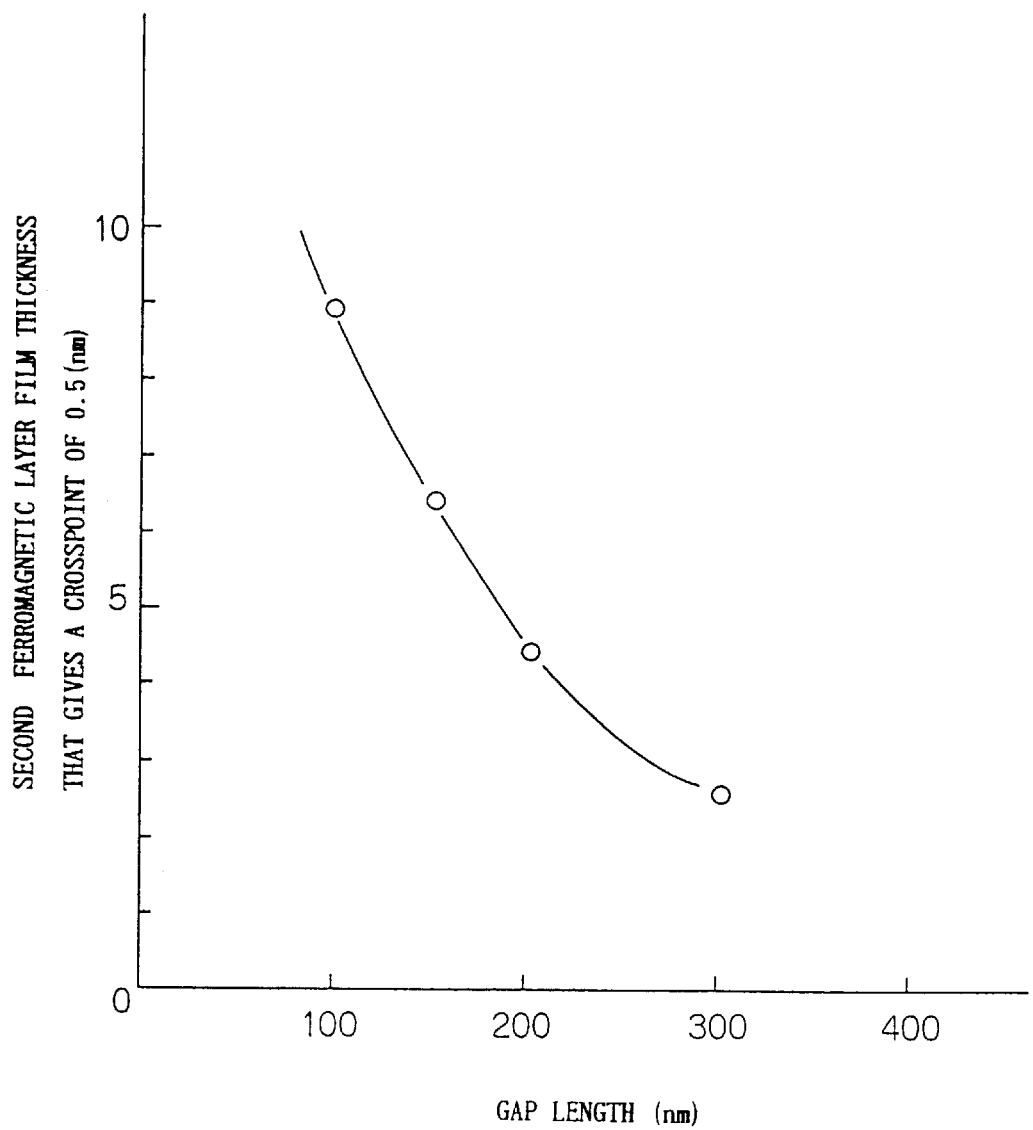
FIG. 30 is a graph which shows the relationship between the gap length and the second ferromagnetic layer film thickness at which the crosspoint is 0.5 in the magnetoresistive sensor of FIG. 24.

FIG. 29 shows the relationship between the crosspoint and the film thickness of the second ferromagnetic layer when the film thicknesses of the upper gap layer and the lower gap layer are changed, while FIG. 30 shows the relationship between the film thickness of the second ferromagnetic layer which gives a crosspoint of 0.5 and the film thicknesses of the upper gap layer and the lower gap layer.

Figure 28:
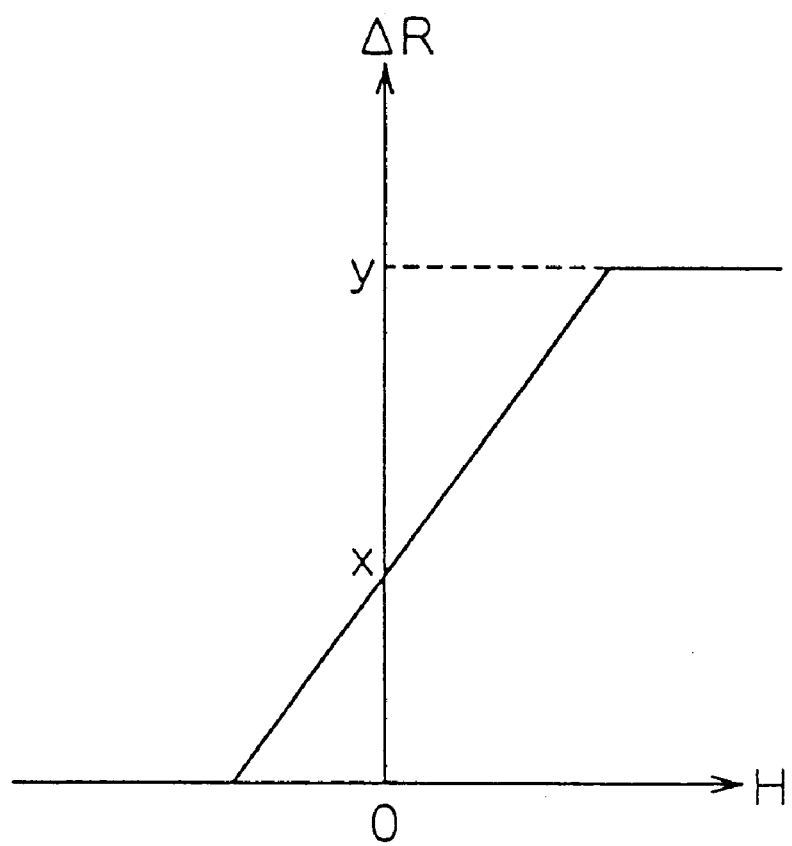
FIG. 28 is a graph which illustrates the definition of the crosspoint.

In this case, the film thicknesses of the upper gap layer and the lower gap layer were made the same, and the second ferromagnetic layer film thickness was held at 6 nm, and the definition about the cross point in given in FIG. 28.

The crosspoint decreased with an increase in the second ferromagnetic layer film thickness. The film thickness of the second ferromagnetic layer which gave a crosspoint of 0.5 decreased linearly with an increase in the film thicknesses of the lower gap layer and the upper gap layer, this being 10 nm or smaller in all cases.

Figure 31:
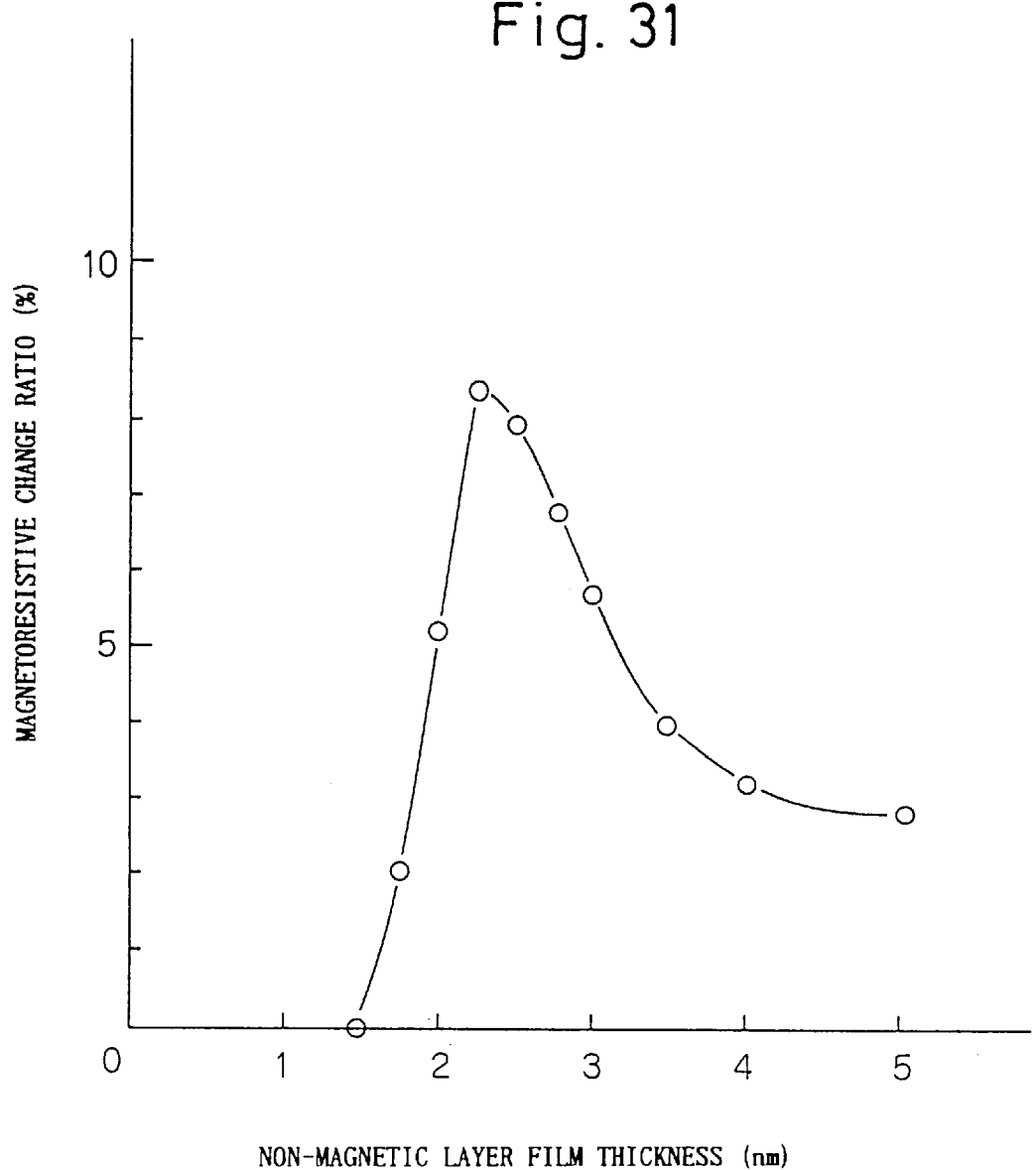
FIG. 31 is a graph which shows the relationship between the non-magnetic layer film thickness and the magnetoresistive change ratio, in the magnetoresistive sensor of FIG. 24.

FIG. 31 shows the MR ratio of a magnetoresistive effect element for the case in which the thickness of the copper non-magnetic layer film thickness is changed. It can be seen that, with a non-magnetic layer film thickness from 2 to 3 nm, the MR ratio exceeds 5%, making this an appropriate range for the film thickness.

Figure 32:
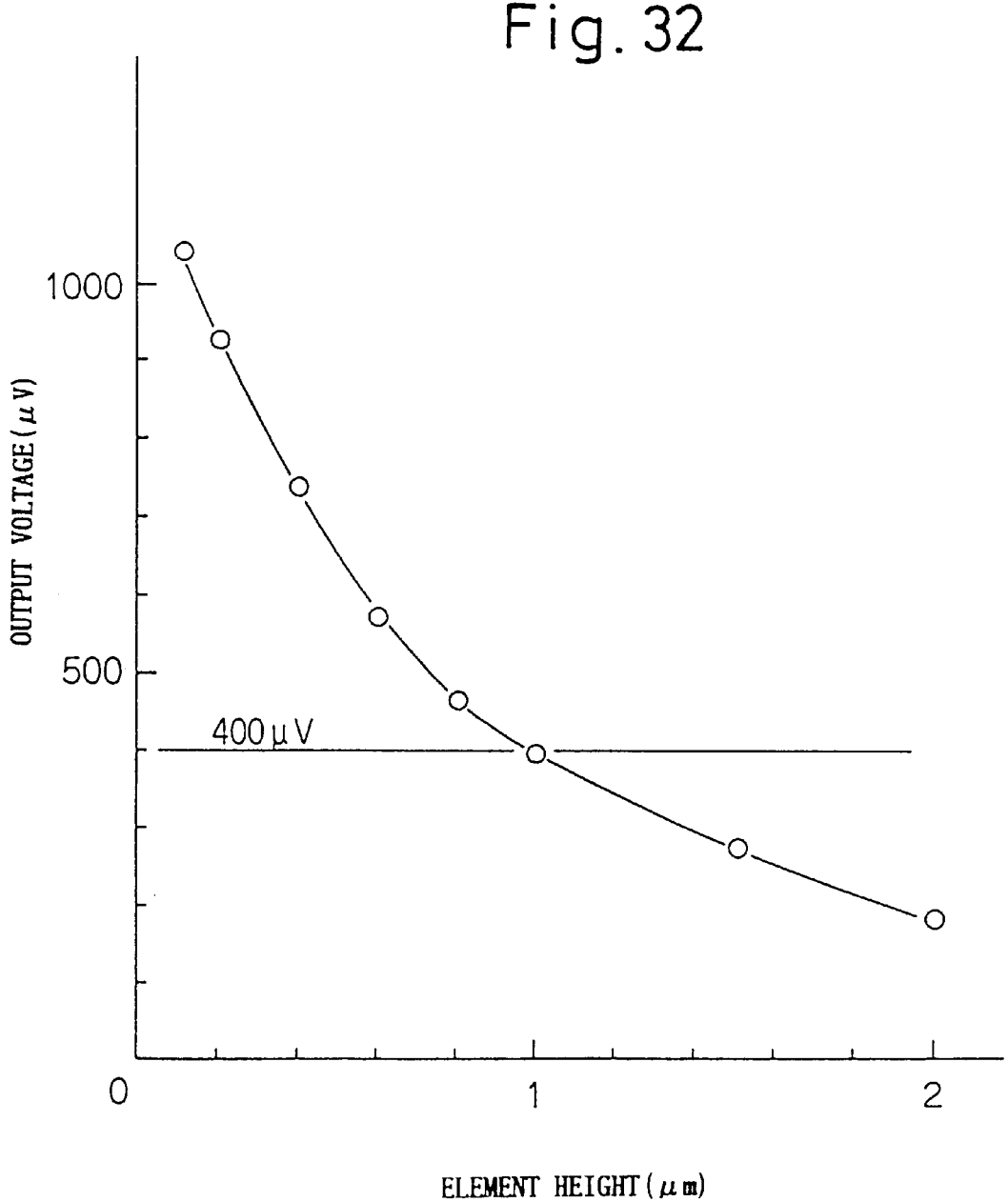
FIG. 32 is a graph which shows the relationship between the element height and the output voltage, in the magnetoresistive sensor of FIG. 24.

FIG. 32 shows the relationship between the element height and the output voltage.

In order to achieve a hard disk drive in with recording density in the gigabit class, although the output voltage of about 400 $\mu$V is usually required, it can be seen that at an element height of 1 $\mu$m or less, the output voltage obtained is greater than 400 mV, so that the desirable range for the element height would be 1 $\mu$m or less.

FIG. 33 shows the output signal half-value width for anti-ferromagnetic layer film thicknesses ranging from 5 to 100 nm, with a linear medium speed of 10 m/second for recording and playback.

To achieve a high recording density of greater than 2 Gb/inch2, it is necessary to have an output signal half-value width of 25 ns (not shown in the drawing) or smaller, and it can be seen that this condition is satisfied when the film thickness of the anti-ferromagnetic layer is 30 nm or smaller.

Next, a magnetic disk apparatus to which the present invention is applied will be described. The magnetic disk apparatus has three magnetic disks on top of a base, a head drive circuit, a signal processing circuit, and an input/output interface being housed on the reverse side of the base. A 32-bit bus line is used to make connection to the outside.

Six heads are disposed on each side of a disk. The apparatus also includes the rotary actuators and associated drive circuits and control circuits for the purpose of driving the heads, and a directly coupled motor to rotationally drive the spindle.

The disk diameter is 46 mm, the used diameter range of the data surface of which being from 10 mm to 40 mm. An embedded servo system is used and, because a servo surface is not used, it is possible to achieve high density. This apparatus can be directly connected as an external memory device for a small computer.

The input/output interface has a cache memory, enabling the accommodation of a bus line with a transfer rate in the range from 5 to 20 megabytes/second.

It is possible to provide an external controller and to connect a number of apparatuses thereto, enabling the configuration of a high-capacity magnetic disk apparatus.

It is possible to configure the magnetoresistive effect element according to the present invention as a shielded-type magnetoresistive effect element, in which the top and bottom of the magnetoresistive effect element are sandwiched, with an intervening insulating layer, between a high-permeability, soft-magnetic material.

It is also possible to configure a magnetoresistive detection system which has a magnetoresistive effect sensor having a magnetoresistive effect element according to the present invention, means for generating a current passing through this magnetoresistive effect sensor, and means for detecting the change in the ratio of the resistance in the above-noted magnetoresistive effect sensor as a function for magnetic field detected.

In addition, it is possible to configure a magnetic storage system having a magnetic storage medium having a plurality of tracks for the recording of data, a magnetic recording system for recording data onto the above-noted magnetic storage medium, the above-noted magnetoresistive effect detection system, and an actuator means which is linked to the above-noted magnetoresistive effect detection and the above-noted magnetic recording system for the purpose of moving the above-noted magnetoresistive effect detection system and the above-noted magnetic recording system to a selected track of the above-noted magnetic storage medium.

According to the magnetoresistive effect element and manufacturing method therefor according to the present invention, not only is the exchange coupling magnetic field applied from the anti-ferromagnetic layer to a fixed layer large, but also the coercivity of the fixed layer is small, so that there is little hysteresis on the R-H loop, thereby achieving good playback characteristics. The result of this is an improvement in, for example, corrosion resistance, exchange coupling magnetic field, hysteresis characteristics, MR ratio, crosspoint, and output signal half-value width.

What is claimed is:

1. A magnetoresistive effect element comprising: at least, an anti-ferromagnetic layer;
an intermediate layer;
a first ferromagnetic layer;
a non-magnetic layer; and
a second ferromagnetic layer,
wherein said anti-ferromagnetic layer comprises nickel oxide, and wherein said intermediate layer comprises a mixture of a nickel oxide and a ferrous oxide.

2. A magnetoresistive effect element comprising: at least, an anti-ferromagnetic layer;
an intermediate layer;
a first ferromagnetic layer;
a first MR enhancement layer;
a non-magnetic layer;
a second MR enhancement layer; and
a second ferromagnetic layer,
wherein said anti-ferromagnetic layer comprises nickel oxide, and wherein said intermediate layer comprises a mixture of a nickel oxide and a ferrous oxide.

3. The magnetoresistive effect element according to claim 1, wherein the film thickness of said intermediate layer is in the range from 0.1 to 3.0 nm.

4. The magnetoresistive effect element according to claim 2, wherein the film thickness of said intermediate layer is in the range from 0.1 to 3.0 nm.

5. The magnetoresistive effect element according to claim 1, wherein a ratio of (number of Ni atoms)/(number of Ni atoms+number of O atoms) in said anti-ferromagnetic layer is in the range from 0.3 to 0.7.

6. The magnetoresistive effect element according to claim 2, wherein a ratio of (number of Ni atoms)/(number of Ni atoms+number of O atoms) in said anti-ferromagnetic layer is in the range from 0.3 to 0.7.

7. The magnetoresistive effect element according to claim 1, wherein a ratio of (number of O atoms)/(number of Ni atoms+number of Fe atoms+number of O atoms) in said intermediate layer is in the range from 0.1 to 0.5.

8. The magnetoresistive effect element according to claim 2, wherein a ratio of (number of O atoms)/(number of Ni atoms+number of Fe atoms+number of O atoms) in said intermediate layer is in the range from 0.1 to 0.5.

9. The magnetoresistive effect element according to claim 1, wherein the surface roughness of said nickel oxide layer is 10 nm or less.

10. The magnetoresistive effect element according to claim 2, wherein the surface roughness of said nickel oxide layer is 10 nm or less.

11. The magnetoresistive effect element according to claim 1, wherein each of said first ferromagnetic layer and said second ferromagnetic layer comprises a material having as its main component NiFe or NiFeCo.

12. The magnetoresistive effect element according to claim 1, wherein said first ferromagnetic layer comprises a material having as its main component cobalt or CoFe, and wherein said second ferromagnetic layer comprises a material having as its main component NiFe or NiFeCo.

13. The magnetoresistive effect element according to claim 2, wherein said first ferromagnetic layer comprises a material having as its main component cobalt or CoFe, and wherein said second ferromagnetic layer comprises a material having as its main component NiFe or NiFeCo.

14. The magnetoresistive effect element according to claim 1, wherein said anti-ferromagnetic layer further comprises one or more materials selected from the group consisting of Pd, Al, Cu, Ta, In, B, Nb, Hf, Mo, W, Re, Ru, Rh, Ga, Zr, Ir, Au and Ag.

15. The magnetoresistive effect element according to claim 2, wherein said anti-ferromagnetic layer further comprises one or more materials selected from the group consisting of Pd, Al, Cu, Ta, In, B, Nb, Hf, Mo, W, Re, Ru, Rh, Ga, Zr, Ir, Au and Ag.

16. The magnetoresistive effect element according to claim 1, wherein said non-magnetic layer comprises one or more materials selected from the group consisting of Cu, Ag and Au.

17. The magnetoresistive effect element according to claim 2, wherein said non-magnetic layer comprises one or more materials selected from the group consisting of Cu, Ag and Au.

18. The magnetoresistive effect element according to claim 1, wherein the material of said non-magnetic layer is selected from the group consisting of copper alone, copper with Ag added thereto, and copper with Re added thereto.

19. The magnetoresistive effect element according to claim 2, wherein the material of said non-magnetic layer is selected from the group consisting of copper alone, copper with Ag added thereto, and copper with Re added thereto.

20. The magnetoresistive effect element according to claim 1, wherein an angle between the easy axes of said first ferromagnetic layer and said second ferromagnetic layer is in the range from 70 degrees to 90 degrees.

21. The magnetoresistive effect element according to claim 2, wherein an angle between the easy axes of said first ferromagnetic layer and said second ferromagnetic layer is in the range from 70 degrees to 90 degrees.

22. The magnetoresistive effect element according to claim 1, having an overall height of 1 $\mu$m or less, the film thickness of said first ferromagnetic layer and said second ferromagnetic layer are 10 nm or less, the film thickness of said non-magnetic layer is 2 nm or greater but not exceeding 3 nm, and the film thicknesses of said anti-ferromagnetic layer is 30 nm or less.

23. The magnetoresistive effect element according to claim 2, having an overall height of 1 $\mu$m or less, the film thicknesses of said first ferromagnetic layer and said second ferromagnetic layer are 10 nm or less, the film thickness of said non-magnetic layer is 2 nm or greater but not exceeding 3 nm, and the film thickness of said anti-ferromagnetic layer is 30 nm or less.

24. In a method for producing a magnetoresistive effect element comprising at least an anti-ferromagnetic layer, an intermediate layer, a first ferromagnetic layer, a non-magnetic layer, and a second ferromagnetic layer, said method is characterized in that, after successively laminating a nickel oxide and NiFe onto a substrate, heat treating at a temperature between 80° C. and 400° C. so as to form said anti-ferromagnetic layer, said intermediate layer comprising a mixture of a nickel oxide and a ferrous oxide, and said first ferromagnetic layer.

25. In a method for producing a magnetoresistive effect element comprising at least an anti-ferromagnetic layer, an intermediate layer, a first ferromagnetic layer, a first MR enhancement layer, a non-magnetic layer, a second MR enhancement layer, and a second ferromagnetic layer, said method is characterized in that, after successively laminating a nickel oxide and NiFe onto a substrate, heat treating at a temperature between 80° C. and 400° C. so as to form said anti-ferromagnetic layer, said intermediate layer comprising a mixture of a nickel oxide and a ferrous oxide, and said first ferromagnetic layer.

26. In a method for producing a magnetoresistive effect element comprising at least an anti-ferromagnetic layer, an intermediate layer comprising a mixture of a nickel oxide and a ferrous oxide, a first ferromagnetic layer, a non-magnetic layer, and a second ferromagnetic layer, said method is characterized in that, after successively laminating at least a nickel oxide, NiFe and said non-magnetic layer onto a substrate, heat treating at a temperature between 80° C. and 300° C. so as to form said anti-ferromagnetic layer, said intermediate layer, and said first ferromagnetic layer.

27. In a method for producing a magnetoresistive effect element comprising at least an anti-ferromagnetic layer, an intermediate layer comprising a mixture of a nickel oxide and a ferrous oxide, a first ferromagnetic layer, a first MR enhancement layer, a non-magnetic layer, a second MR enhancement layer, and a second ferromagnetic layer, said method is characterized in that, after successively laminating a nickel oxide, NiFe, and said non-magnetic layer onto a substrate, heat treating at a temperature between 80° C. and 400° C. so as to form said anti-ferromagnetic layer, said intermediate layer, and said first ferromagnetic layer.

28. In a method for producing a magnetoresistive effect element comprising at least an anti-ferromagnetic layer, an intermediate layer comprising a mixture of a nickel oxide and a ferrous oxide, a first ferromagnetic layer, a first MR enhancement layer, a non-magnetic layer, a second MR enhancement layer, and a second ferromagnetic layer, said method comprising successively laminating a nickel oxide, NiFe, and said first MR enhancement layer onto a substrate, heat treating at a temperature between 80° C. and 300° C. so as to form said anti-ferromagnetic layer, said intermediate layer, and said first ferromagnetic layer.

29. The magnetoresistive effect element according to claim 1, wherein said intermediate layer is arranged between said first ferromagnetic layer and said anti-ferromagnetic layer.

30. The magnetoresistive effect element according to claim 2, wherein said intermediate layer is arranged between said first ferromagnetic layer and said anti-ferromagnetic layer.

31. The magnetoresistive effect element according to claim 1, comprising an anti-ferromagnetic layer, an intermediate layer, a first ferromagnetic layer, a non-magnetic layer, and a second ferromagnetic layer, in this sequence.

32. The magnetoresistive effect element according to claim 2, comprising an anti-ferromagnetic layer, an intermediate layer, a first ferromagnetic layer, a first MR enhancement layer, a non-magnetic layer, a second MR enhancement layer, and a second ferromagnetic layer, in this sequence.

* * * * *